US012701574B2

(12) United States Patent
Yonezawa et al.

(10) Patent No.: US 12,701,574 B2
(45) Date of Patent: Aug. 4, 2026

(54) ELECTRONIC APPARATUS, BASE STATION, COMMUNICATION SYSTEM, METHOD, AND STORAGE MEDIUM

(71) Applicant: KABUSHIKI KAISHA TOSHIBA, Tokyo (JP)

(72) Inventors: Yuki Yonezawa, Ayase Kanagawa (JP); Koji Akita, Yokohama Kanagawa (JP); Daisuke Uchida, Kawasaki Kanagawa (JP); Tomoya Tandai, Tokyo (JP); Miyuki Ogura, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 405 days.

(21) Appl. No.: 17/942,790

(22) Filed: Sep. 12, 2022

(65) Prior Publication Data

US 2023/0199769 A1     Jun. 22, 2023

(30) Foreign Application Priority Data

Dec. 20, 2021    (JP) ................................. 2021-206392
Sep. 1, 2022    (JP) ................................. 2022-139171

(51) Int. Cl.
*H04W 72/20*         (2023.01)
*H04W 72/12*         (2023.01)

(52) U.S. Cl.
CPC ....... *H04W 72/20* (2023.01); *H04W 72/1221* (2013.01)

(58) Field of Classification Search
None
See application file for complete search history.

(56) References Cited

U.S. PATENT DOCUMENTS

| | | | |
|---|---|---|---|
| 2008/0219159 A1* | 9/2008 | Chateau ................. | H04L 69/32 |
| | | | 370/352 |
| 2011/0177813 A1* | 7/2011 | Uemura ................ | H04W 76/50 |
| | | | 455/435.1 |
| 2015/0117342 A1 | 4/2015 | Loehr et al. | |
| 2016/0315673 A1* | 10/2016 | Morita .................. | H04L 1/1887 |
| 2019/0223251 A1* | 7/2019 | Jiang ..................... | H04W 76/11 |

(Continued)

FOREIGN PATENT DOCUMENTS

| | | |
|---|---|---|
| JP | 2017143525 A | 8/2017 |
| JP | 2021502026 A | 1/2021 |

(Continued)

OTHER PUBLICATIONS

"SmallCellPHY-5G", CommAgility, 2020, 2 pages, https://www.commagility.com/products/5g/smallcellphy-5g.
"SmallCellSTACK-5G", CommAgility, 2020, 1 page, https://www.commagility.com/products/5g/smallcellstack-5g.
Takeda, et al., "NR Physical Layer Specifications in 5G", NTT DOCOMO Technical Journal (English) (vol. 20, No. 3), Jan. 2019, pp. 49-61.

(Continued)

*Primary Examiner* — Kodzovi Acolatse
(74) *Attorney, Agent, or Firm* — Holtz, Holtz & Volek PC

(57) ABSTRACT

According to one embodiment, an electronic apparatus includes a processor located in an interface which divides layers of a base station. The processor is configured to receive a first message transmitted from a first layer which is one of a next lower layer and a next upper layer, interpret the first message and transmit an interpreted message to a second layer which is the other layer, generate a second message based on the interpreted message, transmit the second message to the second layer, and control timing of transmitting the second message.

21 Claims, 27 Drawing Sheets

(56)                      References Cited

U.S. PATENT DOCUMENTS

| 2020/0367182 | A1 | 11/2020 | Zou et al. | |
| 2021/0120527 | A1 | 4/2021 | Rhim et al. | |
| 2021/0160768 | A1 | 5/2021 | Akman et al. | |
| 2021/0274406 | A1* | 9/2021 | Ode | H04W 36/0058 |
| 2021/0377948 | A1 | 12/2021 | Bedekar et al. | |
| 2023/0023138 | A1* | 1/2023 | Qu | H04W 80/02 |
| 2024/0045744 | A1* | 2/2024 | Richards | G06F 15/17 |

FOREIGN PATENT DOCUMENTS

| WO | 2021146702 | A1 | 7/2021 |
| WO | 2021195994 | A1 | 10/2021 |

OTHER PUBLICATIONS

Takeda, et al., "NR Physical Layer Specifications in 5G", NTT DOCOMO Technical Journal (vol. 26, No. 3), Nov. 2018, pp. 47-58.

Japanese Office Action (and an English language translation thereof) dated Dec. 2, 2025, issued in corresponding Japanese Application No. 2022-139171.

Japanese Office Action (and an English language translation thereof) dated Jul. 29, 2025, issued in counterpart Japanese Application No. 2022-139171.

Japanese Decision of Refusal dated Mar. 10, 2023 (and English translation thereof) issued in counterpart JP Application No. 2022-139171.

* cited by examiner

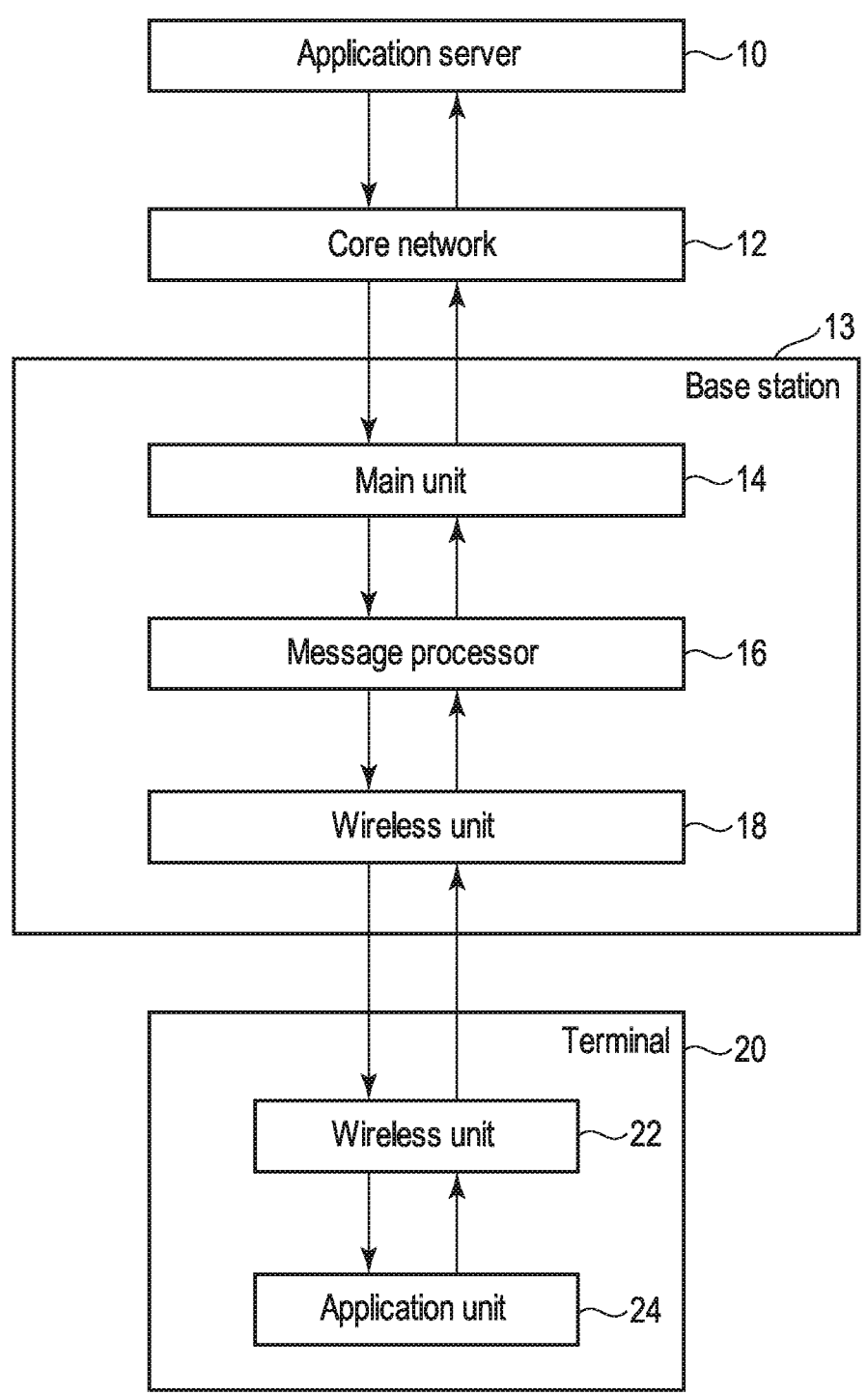
F I G. 1

Protocol stack of base station
| RRC |
| --- |
| PDCP |
| RLC |
| MAC |
| PHY |
F I G. 2
Protocol stack of base station and interface
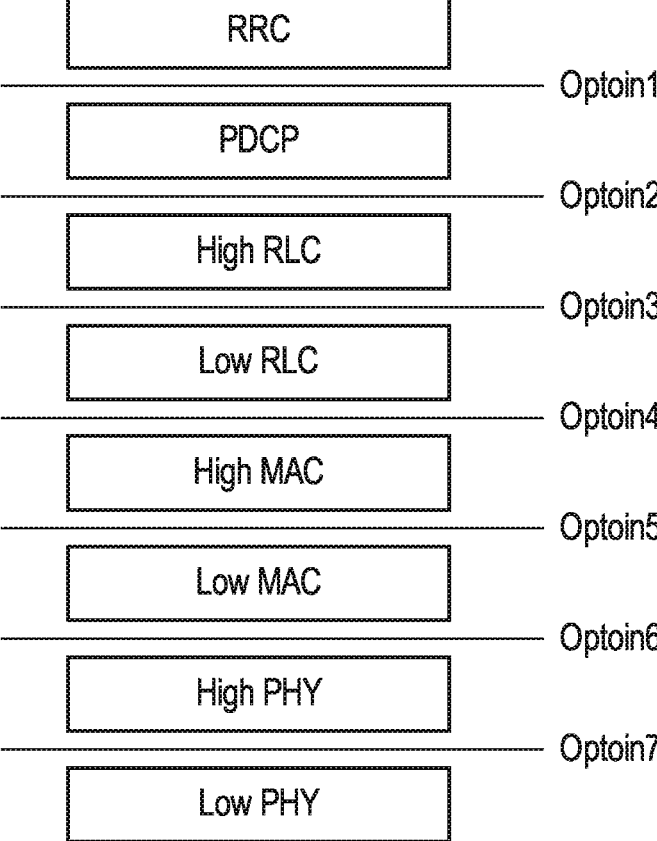
| RRC |
| --- |
——————————————— Optoin1
| PDCP |
| --- |
——————————————— Optoin2
| High RLC |
| --- |
——————————————— Optoin3
| Low RLC |
| --- |
——————————————— Optoin4
| High MAC |
| --- |
——————————————— Optoin5
| Low MAC |
| --- |
——————————————— Optoin6
| High PHY |
| --- |
——————————————— Optoin7
| Low PHY |
| --- |
F I G. 3

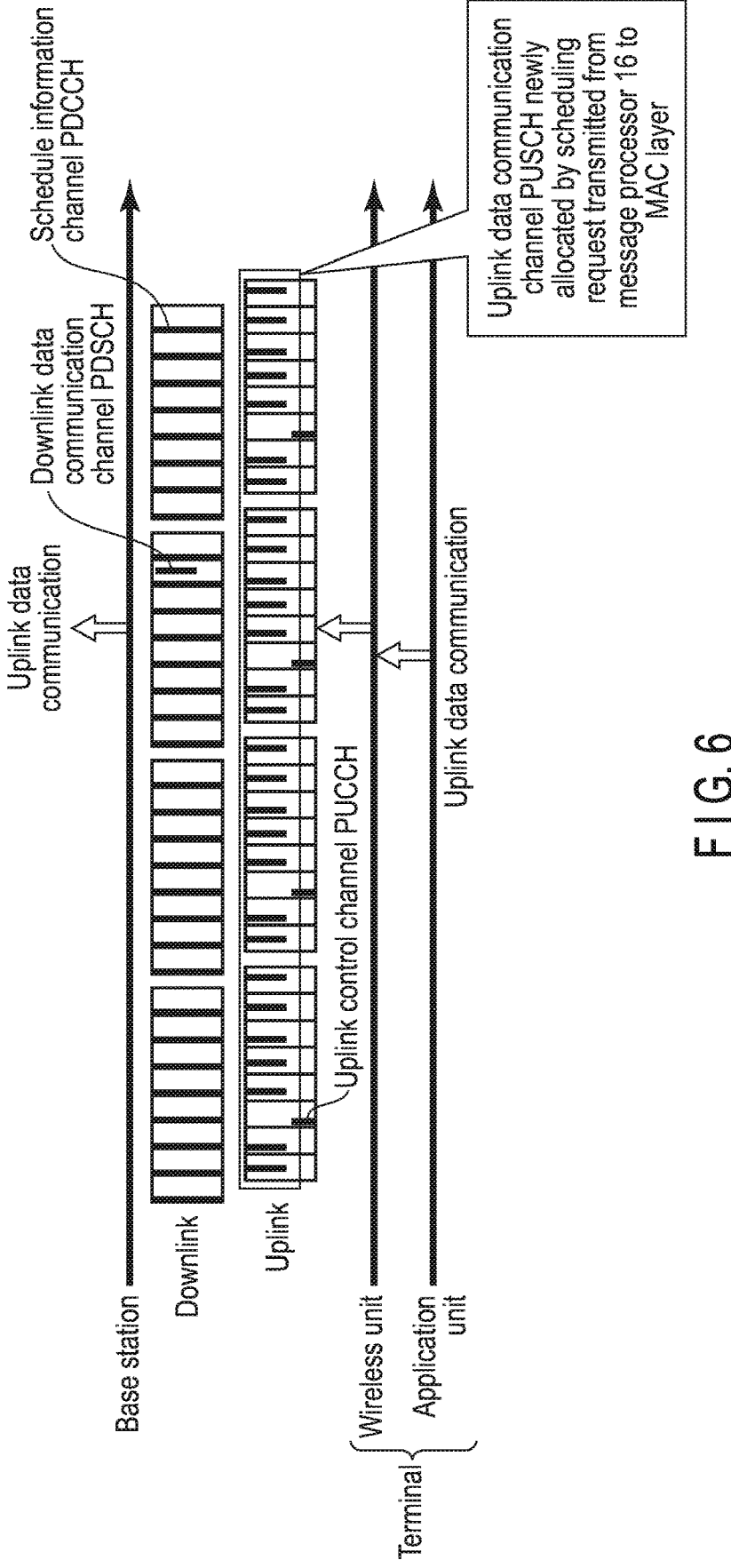
F I G. 6

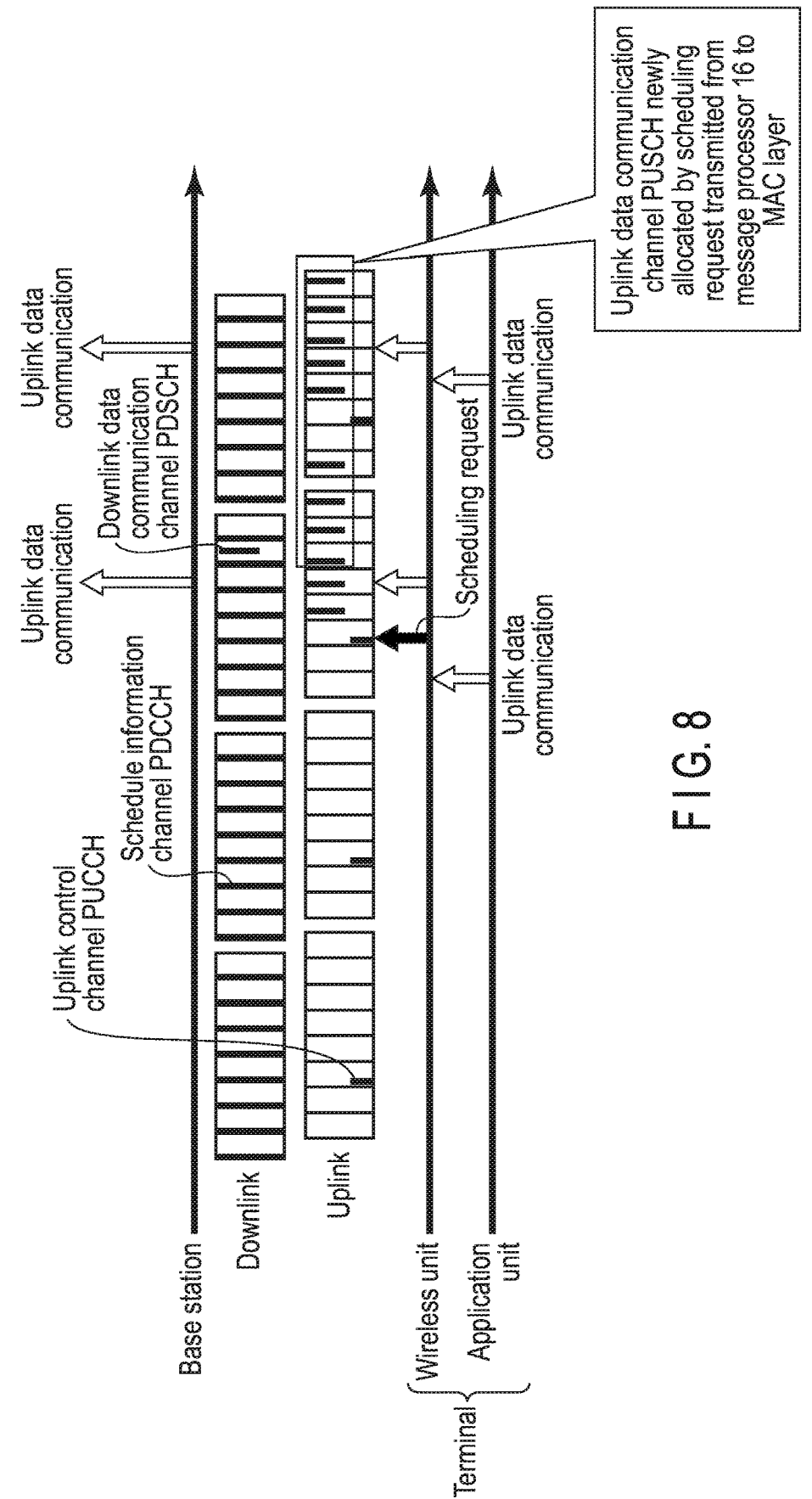
F I G. 8

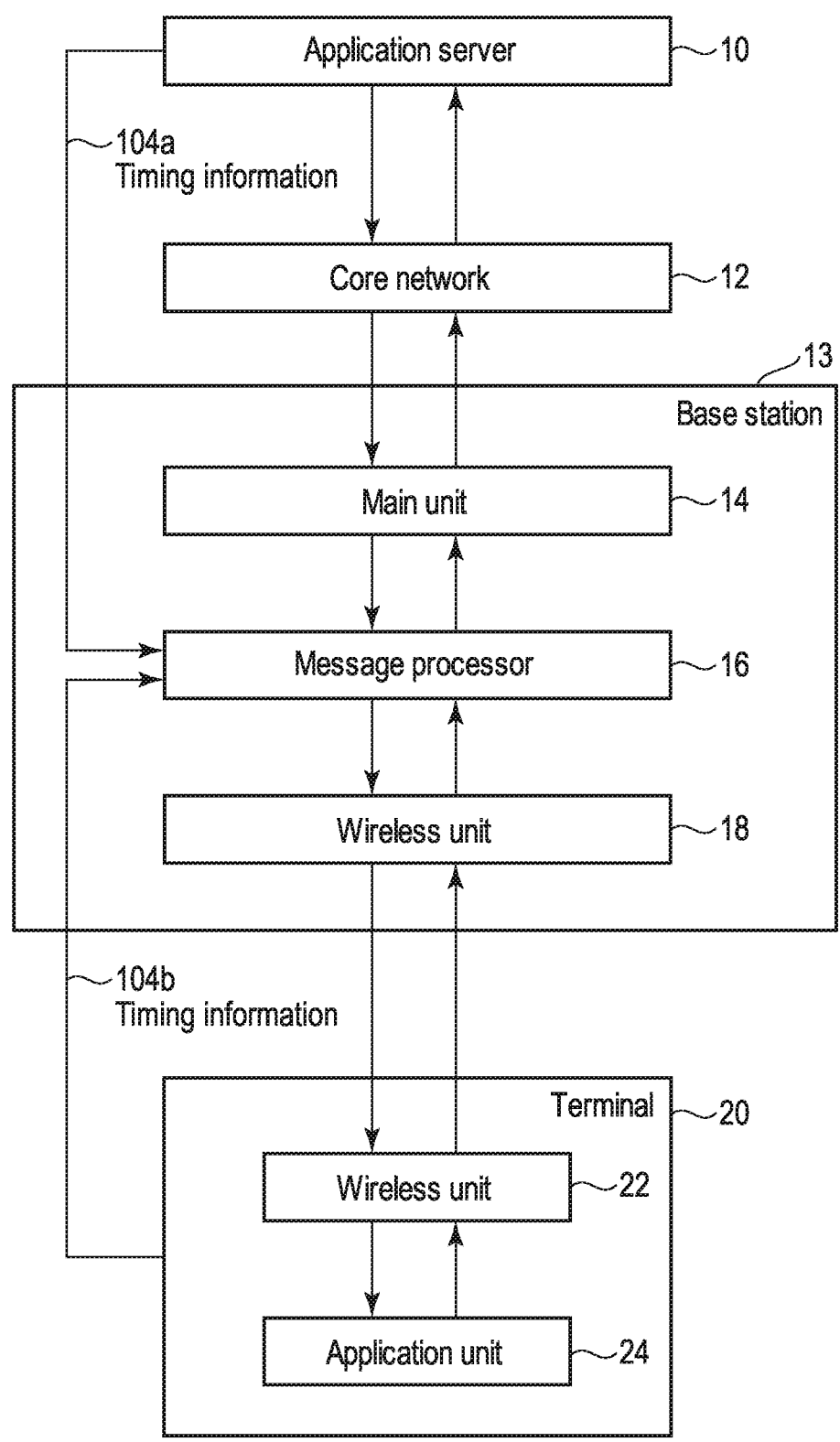
F I G. 9

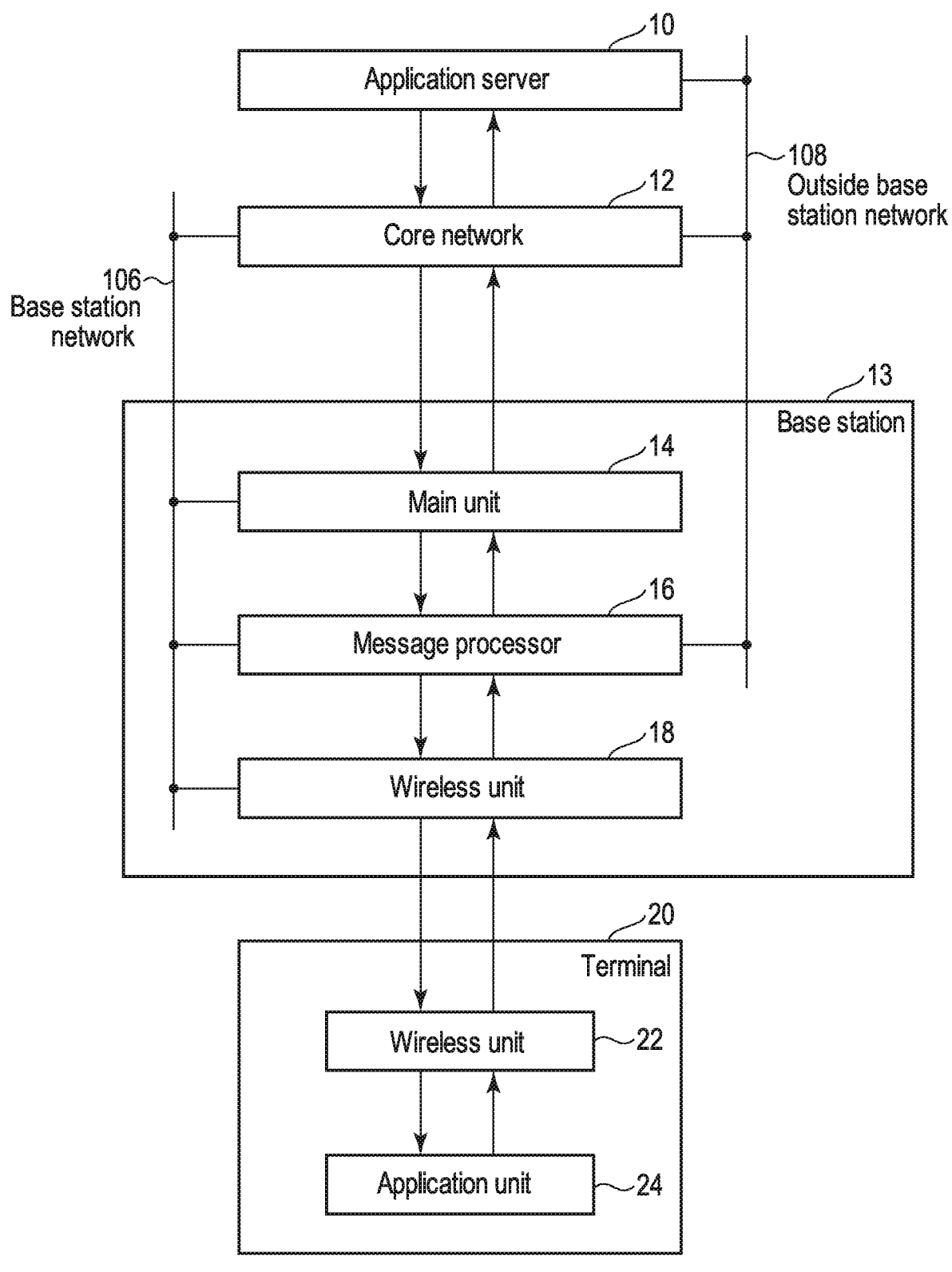
F I G. 10

|           | T1 | T2 | T3 | T4 | T5 | T6 | T7 |
|-----------|----|----|----|----|----|----|----|
| Terminal 1 | ◯ |    | ◯ |    | ◯ |    | ◯ |
| Terminal 2 |    |    | ◯ |    |    | ◯ |    |
| Terminal 3 |    | ◯ |    |    | ◯ |    |    |

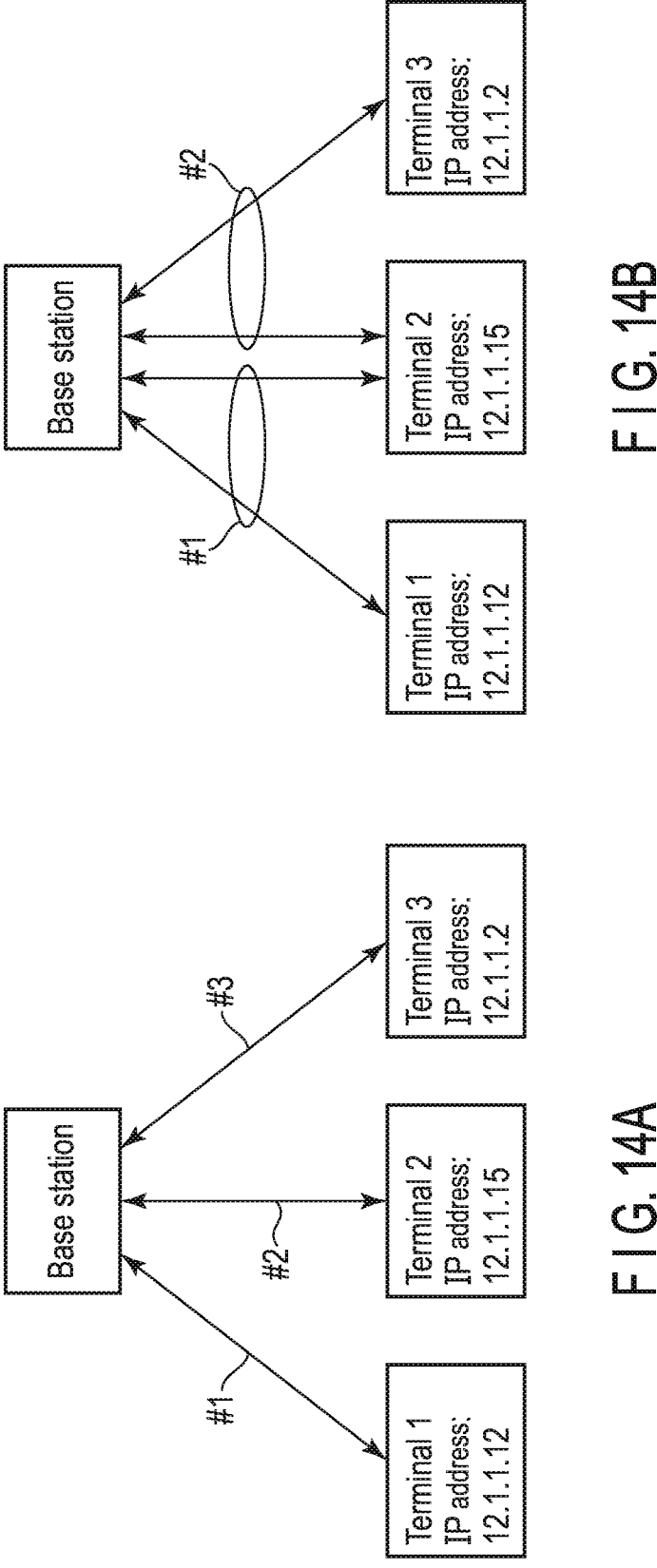
F I G. 14B
F I G. 14A

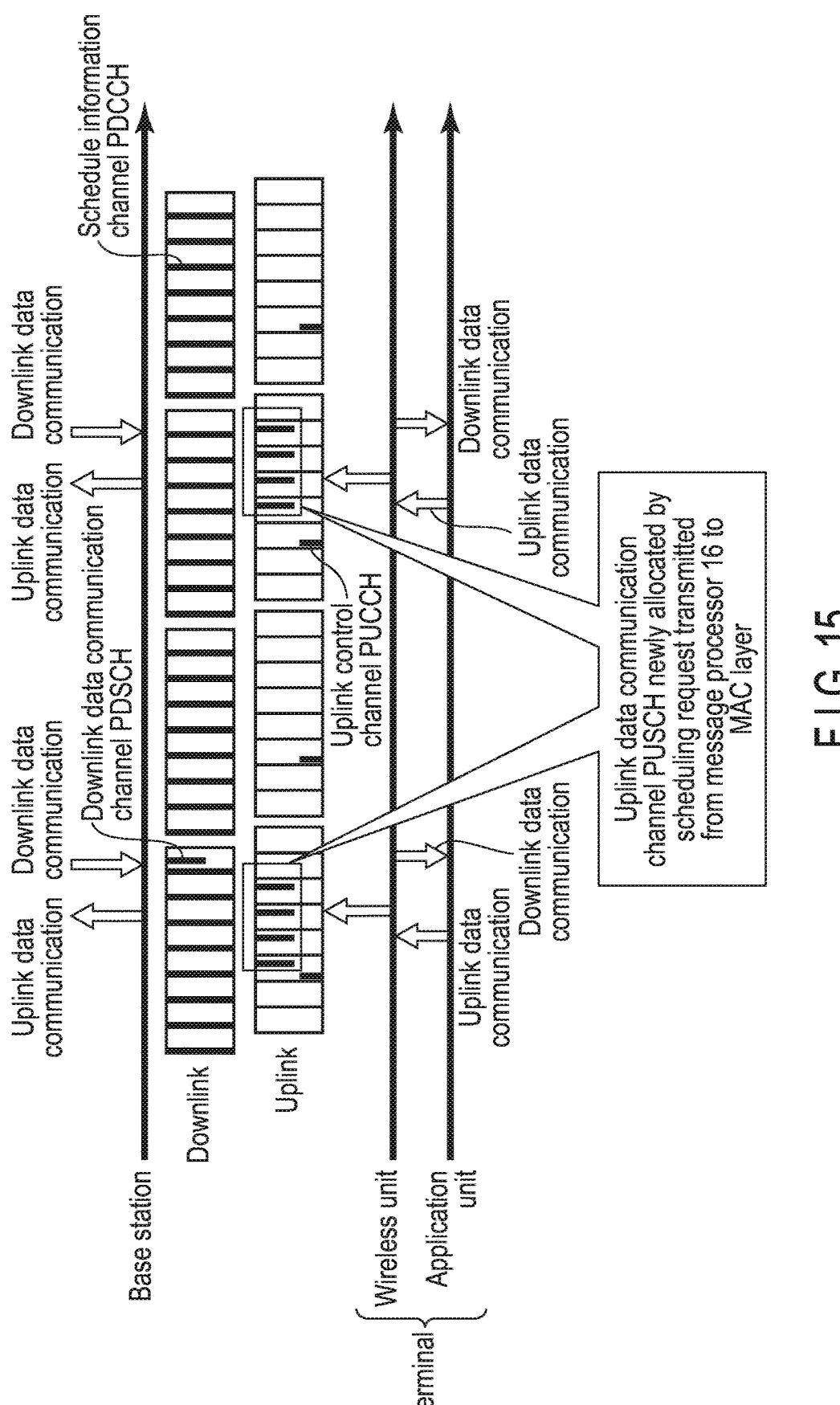
F I G. 15

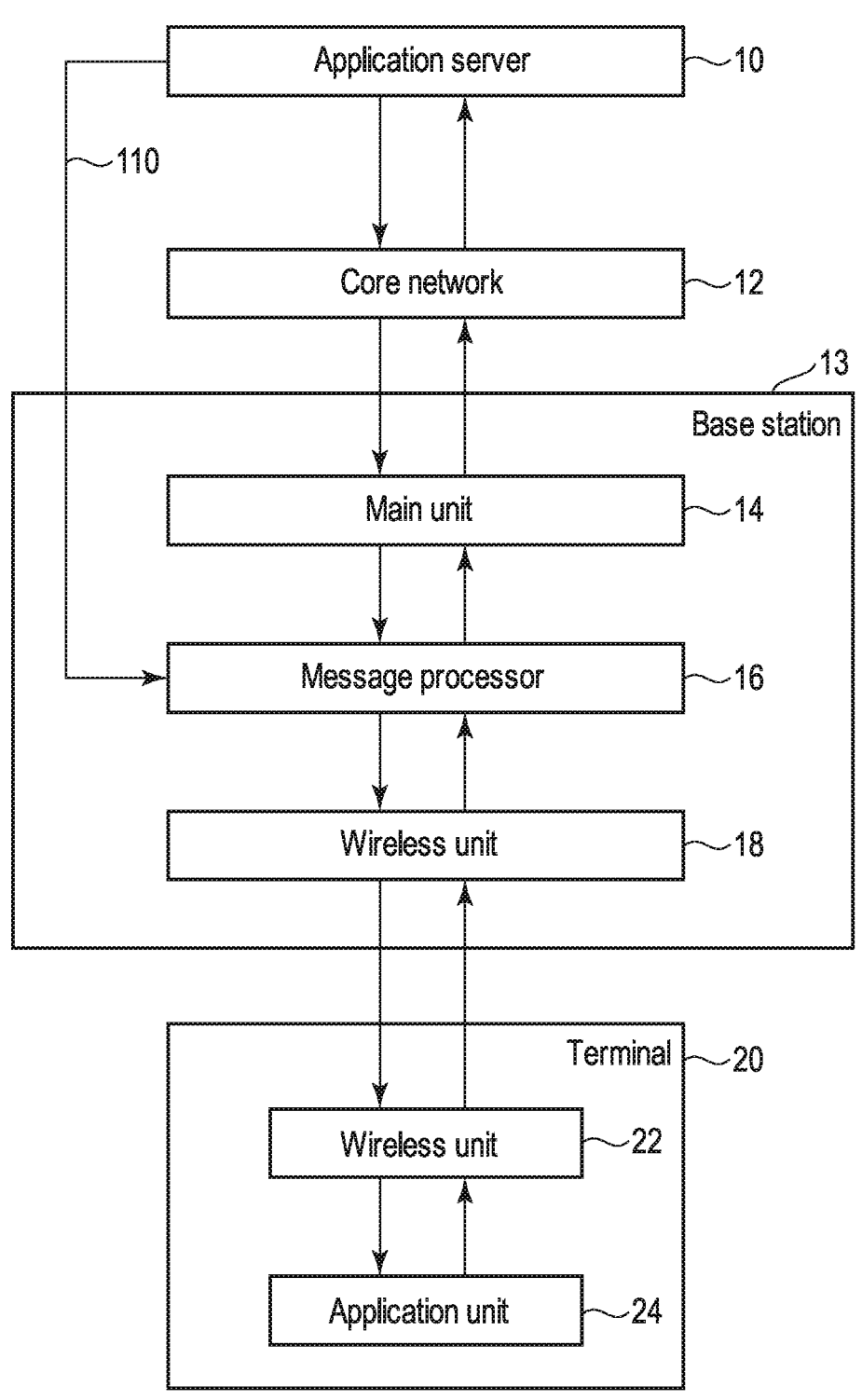
F I G. 16

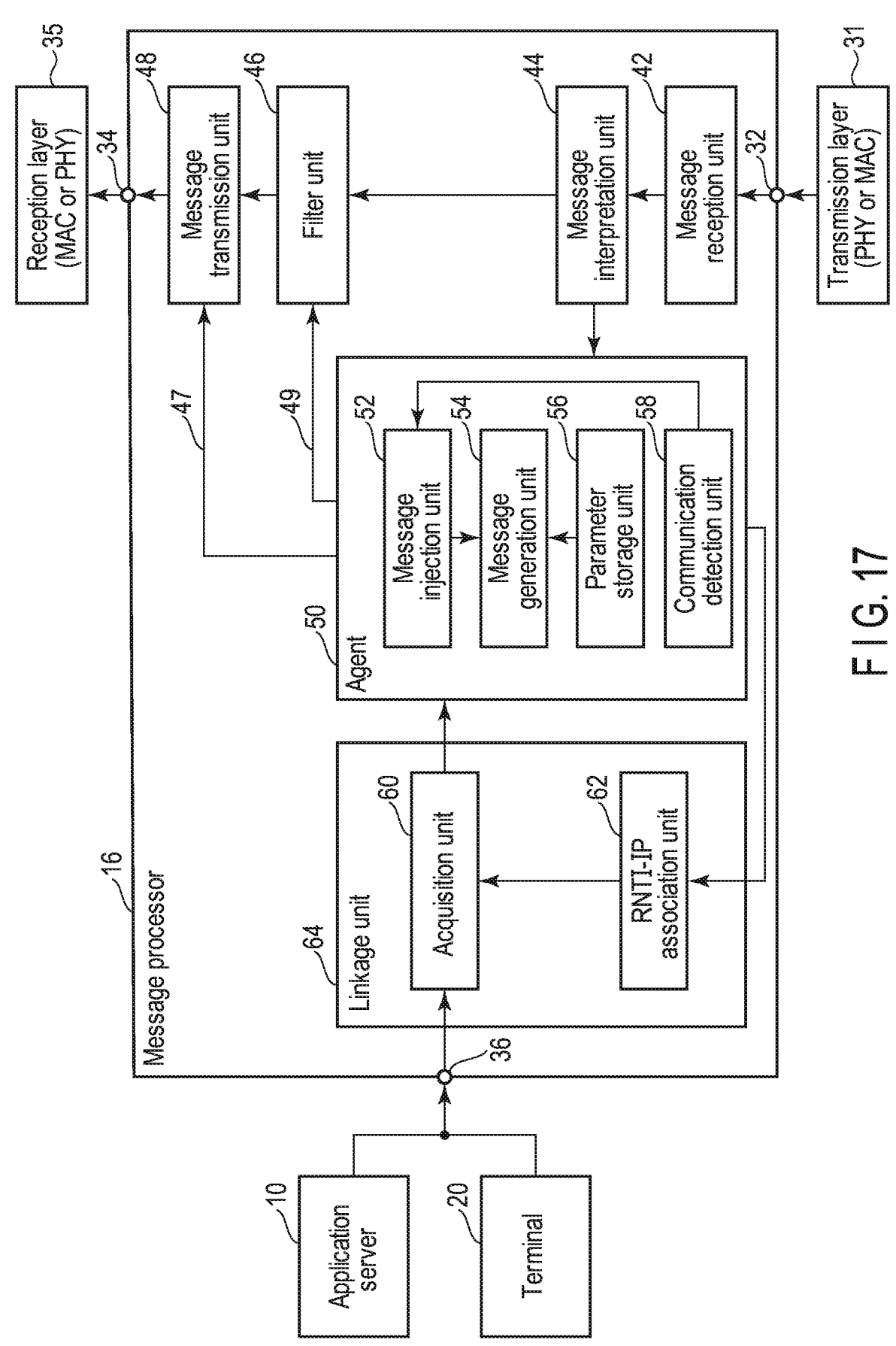
F I G. 17

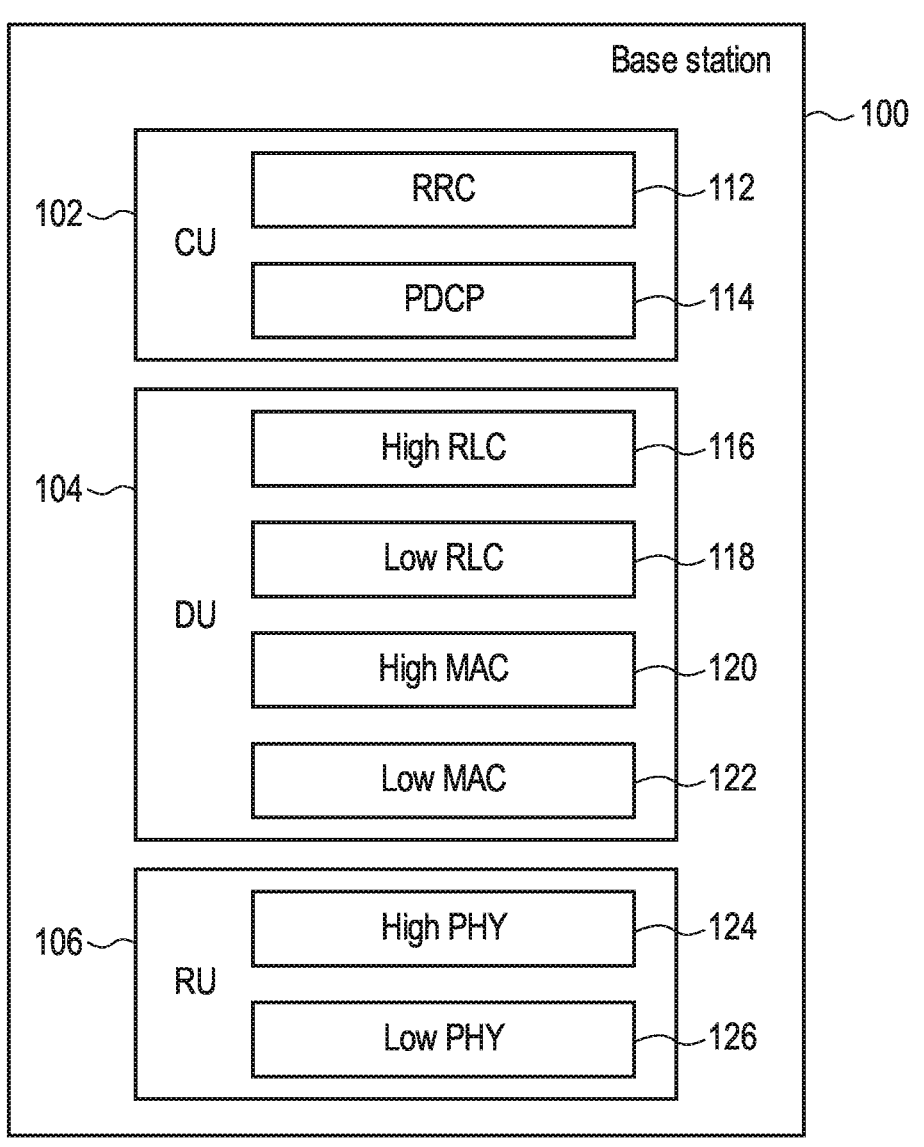
F I G. 18

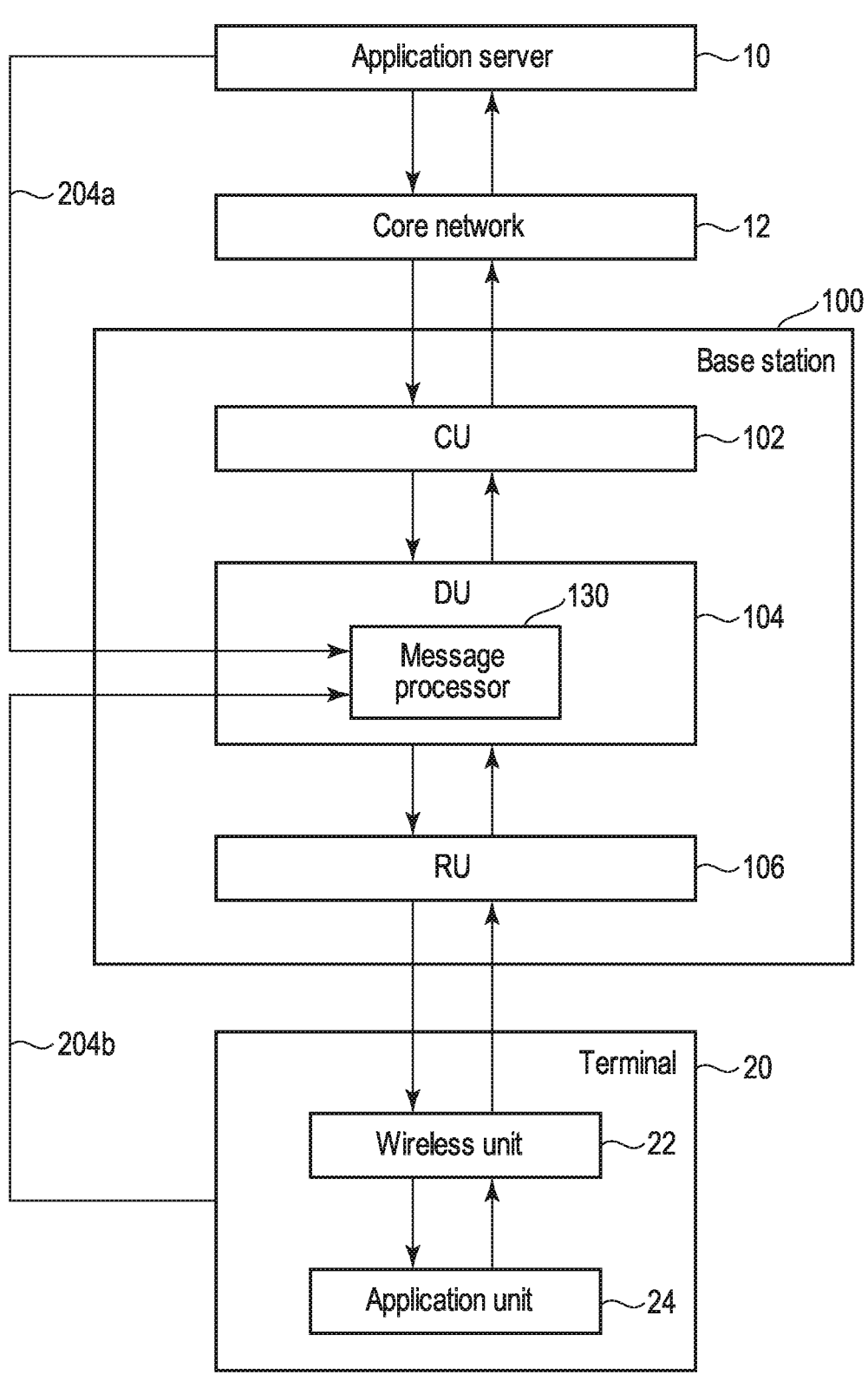
F I G. 19

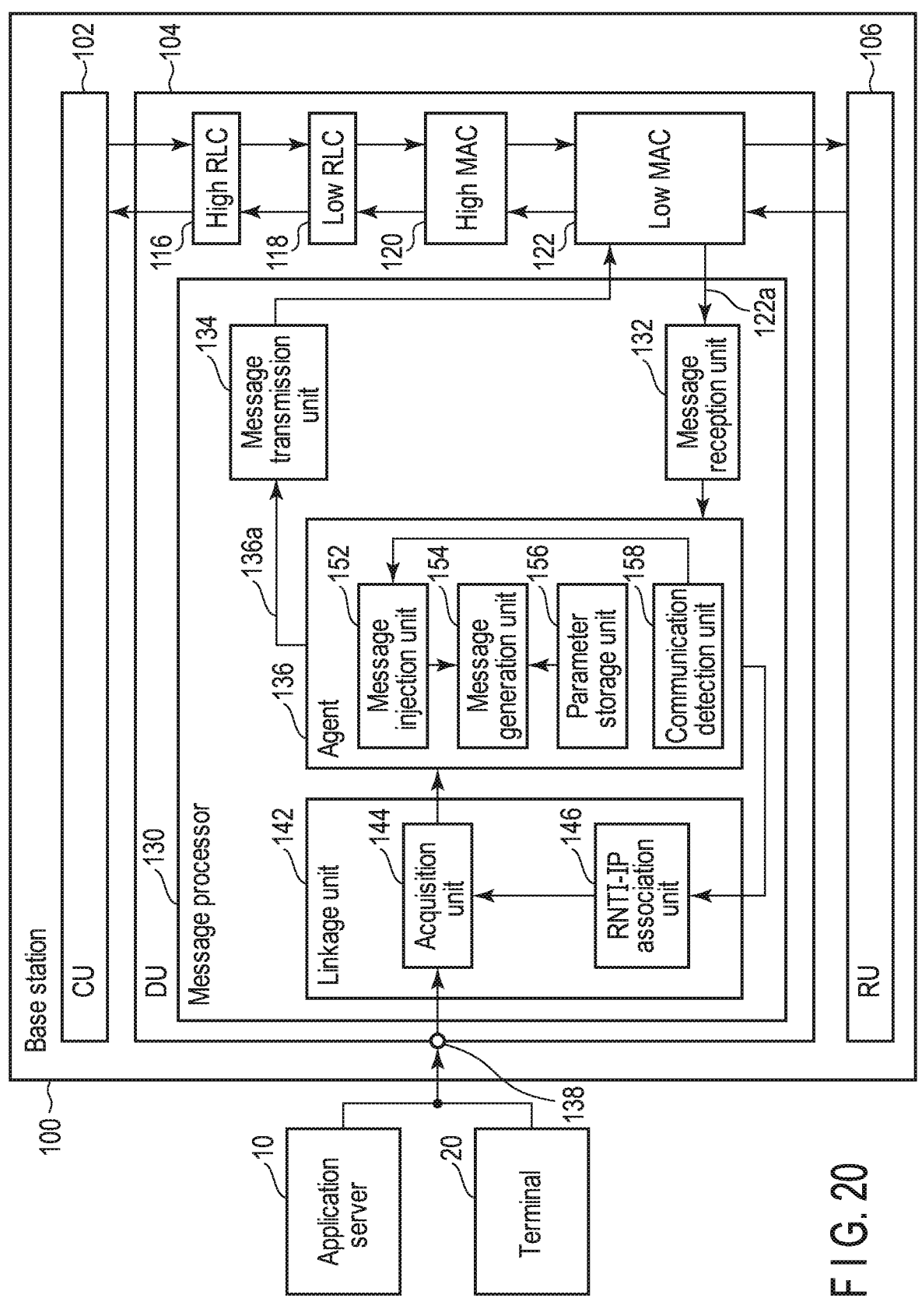
F I G. 20

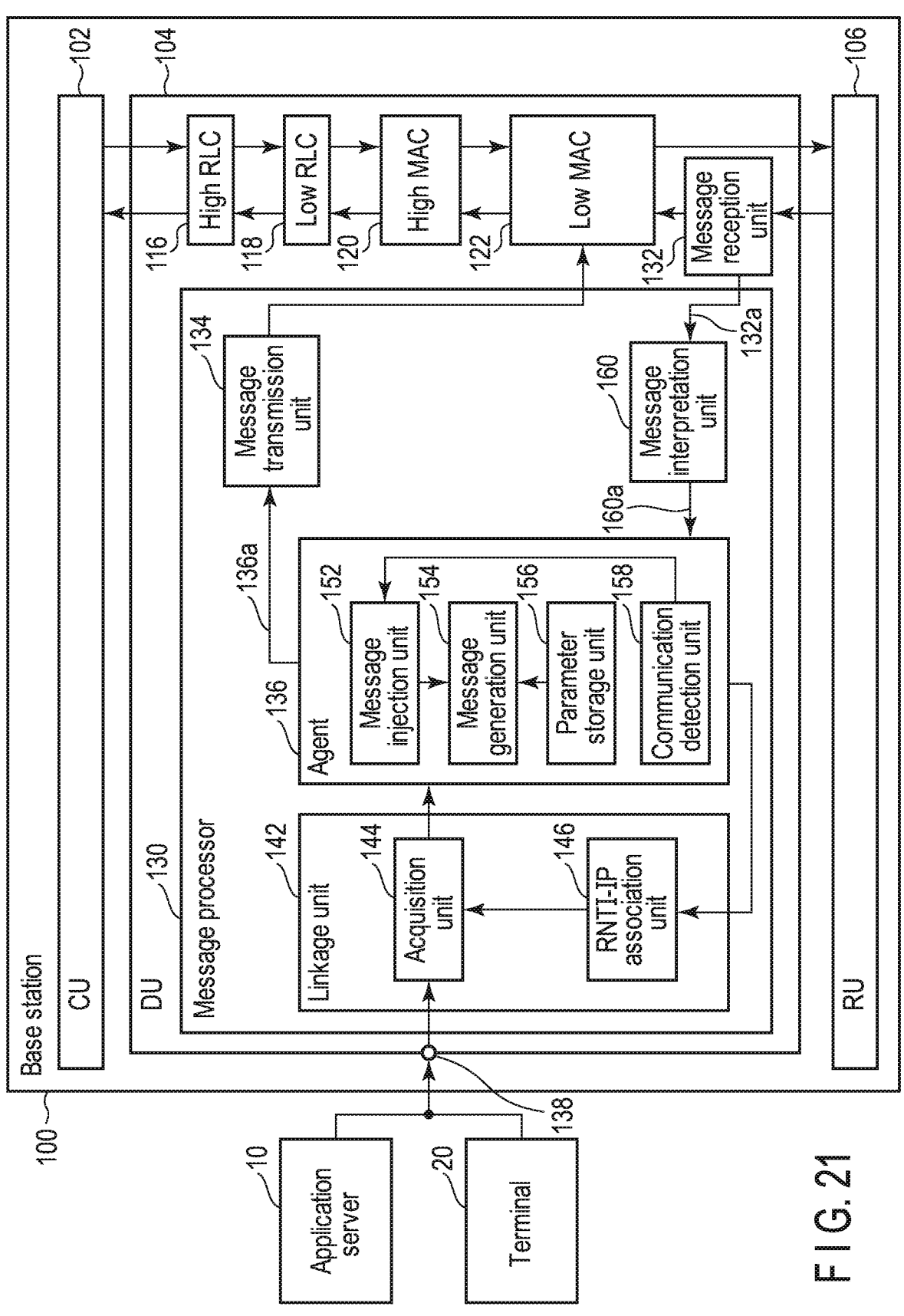
F I G. 21

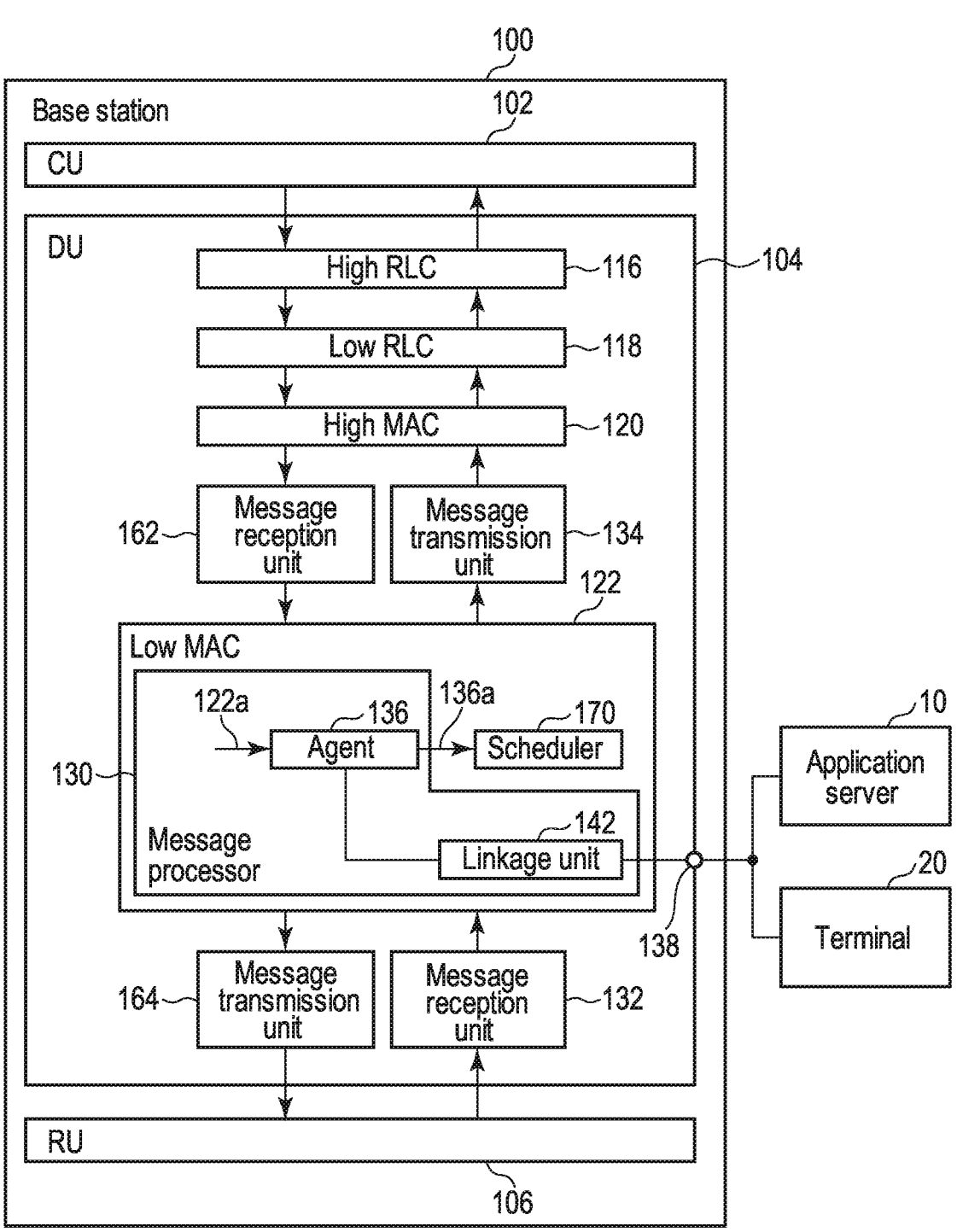
F I G. 22

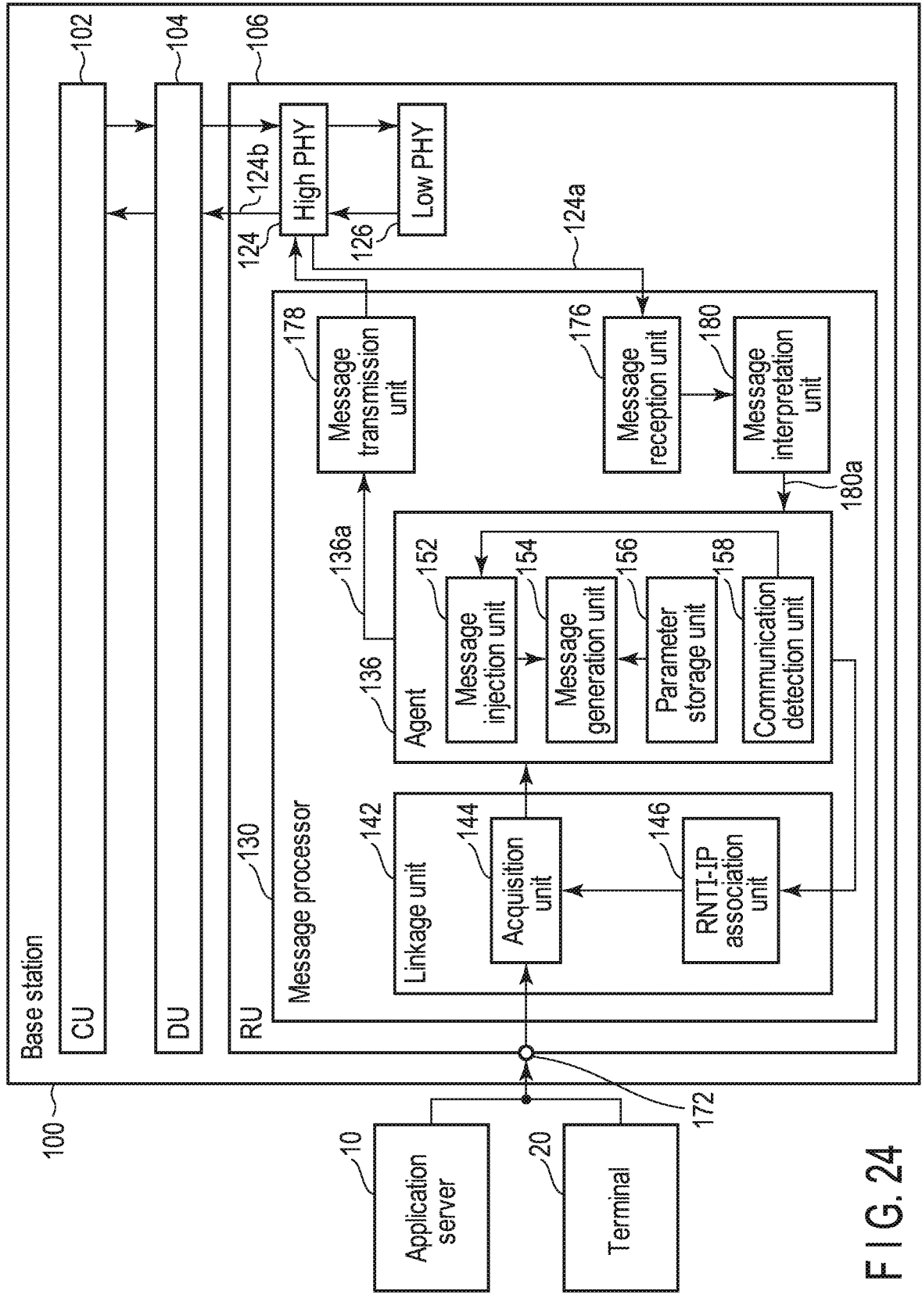
F I G. 24

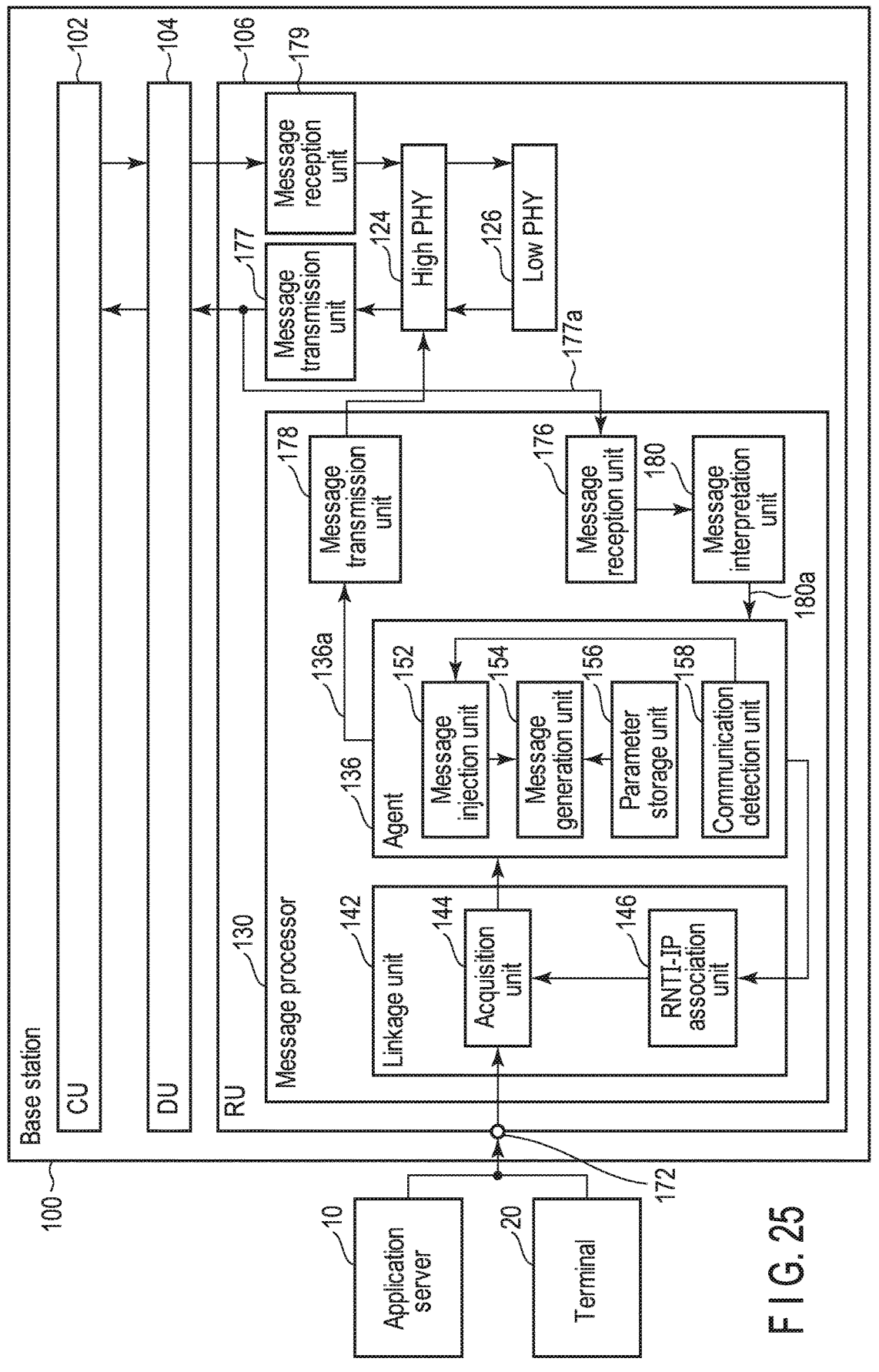
F I G. 25

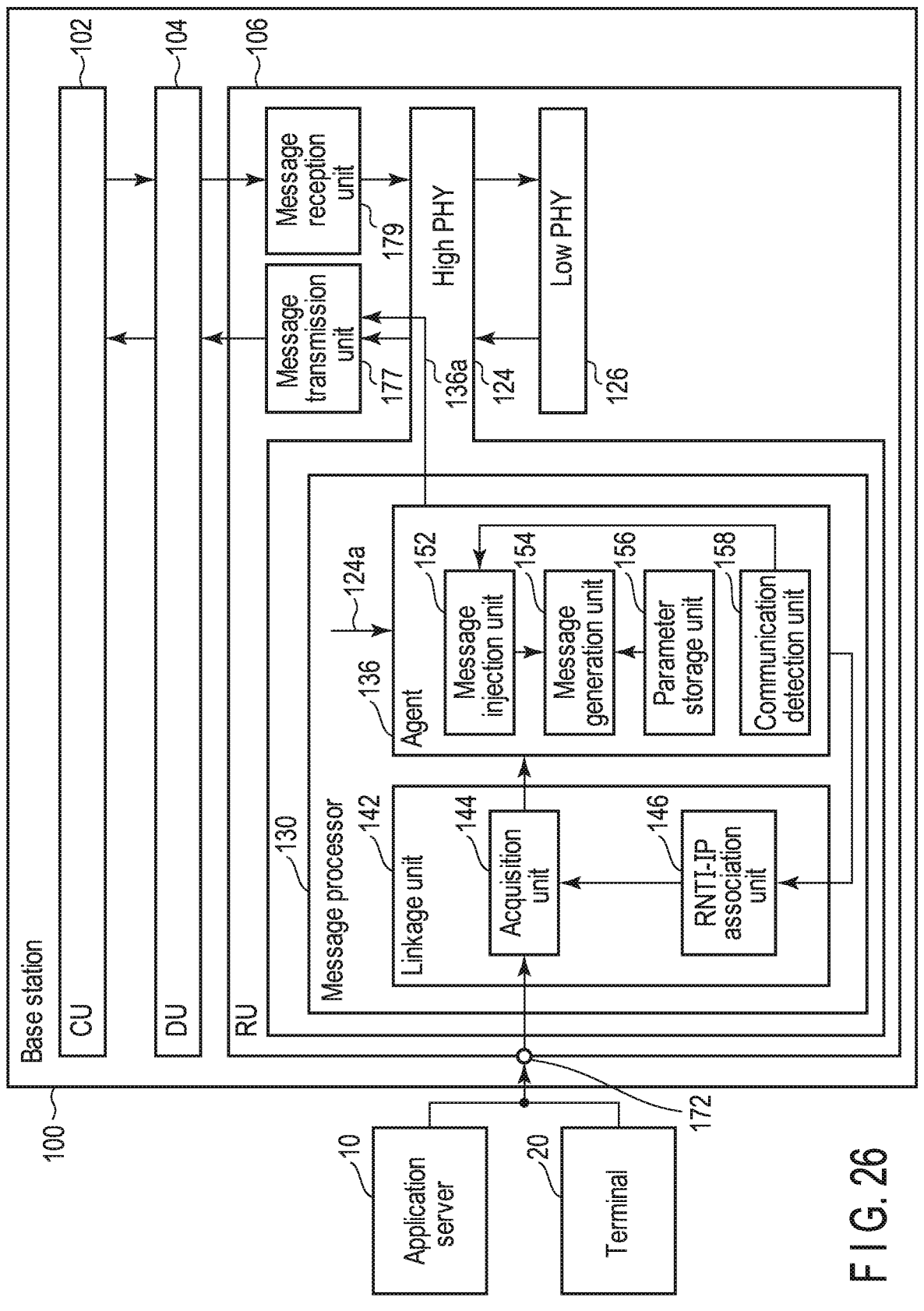
F I G. 26

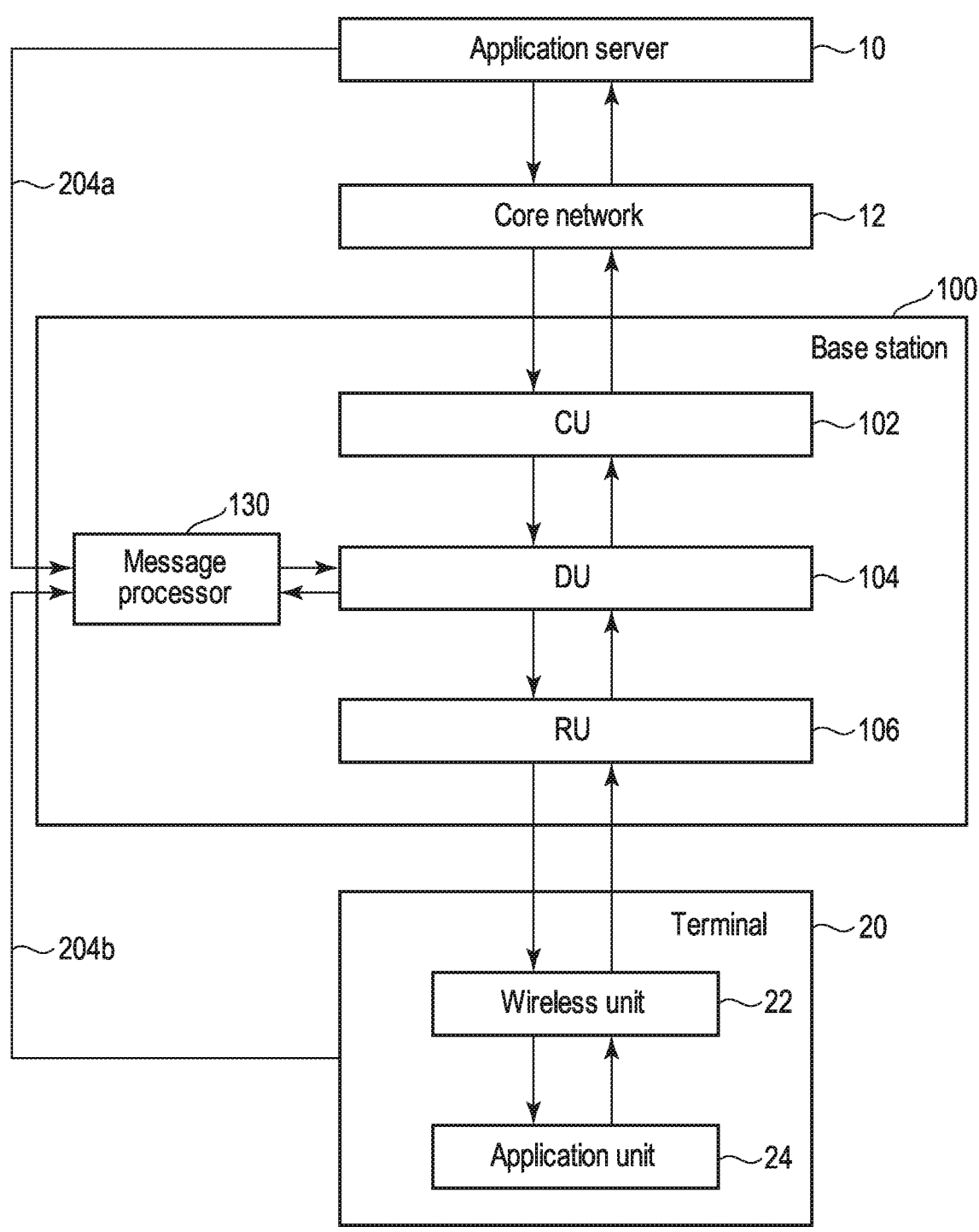
F I G. 27

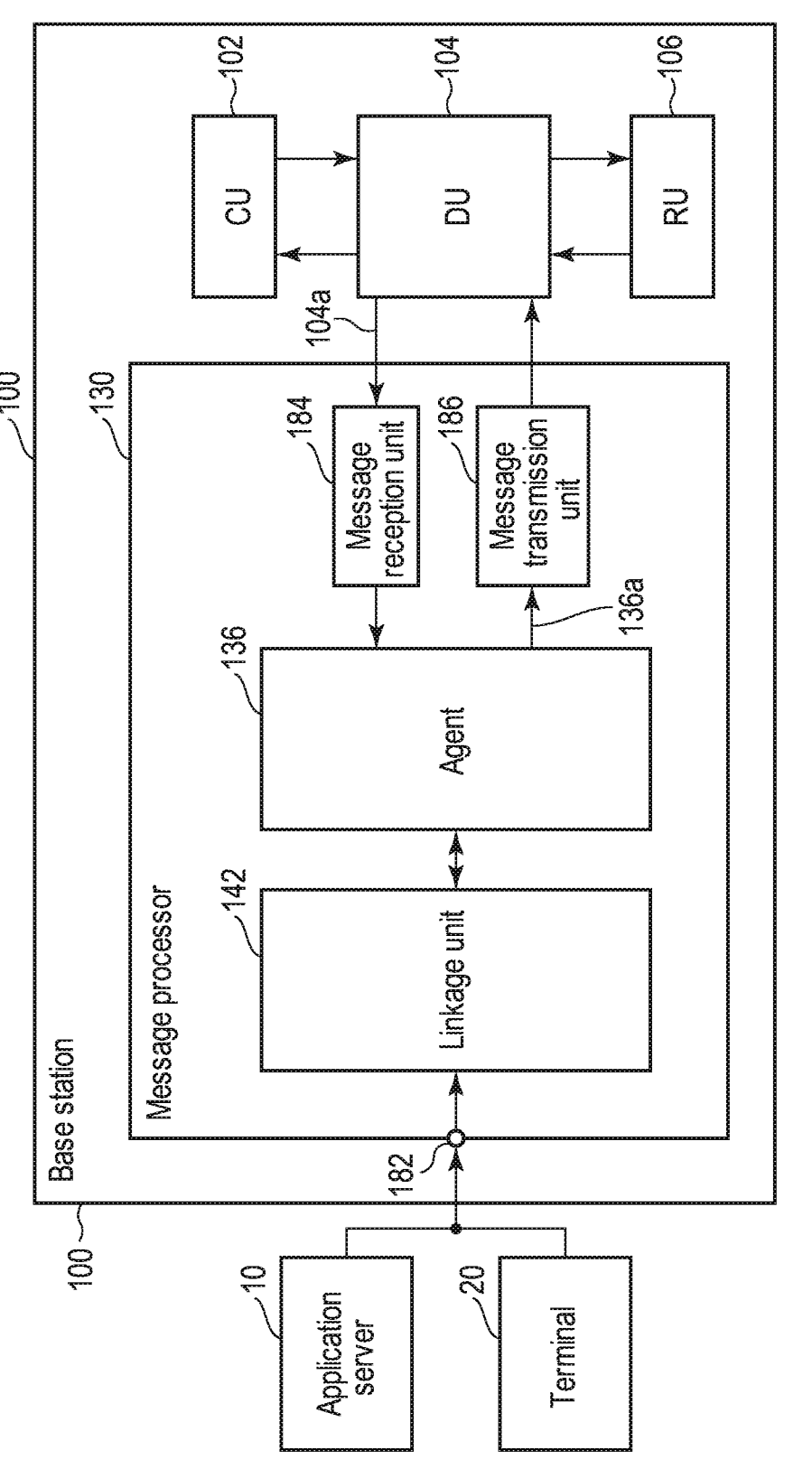
F I G. 28

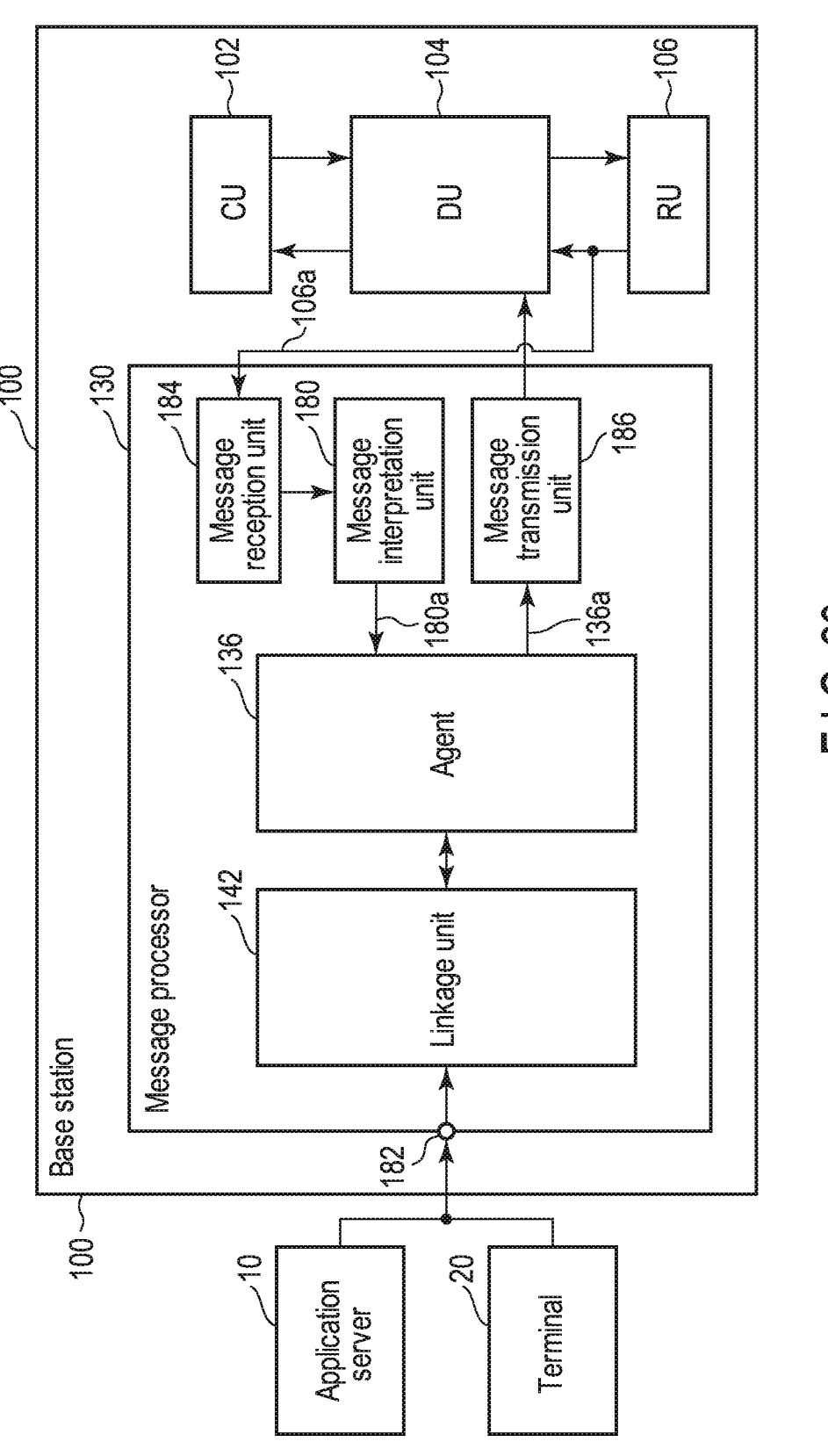
F I G. 29

ELECTRONIC APPARATUS, BASE STATION, COMMUNICATION SYSTEM, METHOD, AND STORAGE MEDIUM

CROSS-REFERENCE TO RELATED APPLICATIONS

This application is based upon and claims the benefit of priority from Japanese Patent Applications No. 2021-206392, filed Dec. 20, 2021; and No. 2022-39171, filed Sep. 1, 2022, the entire contents of all of which are incorporated herein by reference.

FIELD

Embodiments described herein relate generally to an electronic apparatus for a base station, a base station, a communication system, a method, and a storage medium.

BACKGROUND

In the communication between a terminal and a base station, the terminal detects a transmission message, transmits a scheduling request to the base station, receives scheduling allocation from the base station (hereinafter, referred to as scheduling) and transmits data to the base station. Since the terminal takes this procedure, a communication delay easily occurs in the uplink communication from the terminal to the base station. In the communication between the terminal and the base station, the reduction in the delay of the communication is required.

BRIEF DESCRIPTION OF THE DRAWINGS

FIG. 1 is a diagram showing an example of a wireless communication system according to a first embodiment.

FIG. 2 is a diagram showing an example of a protocol stack of a base station according to the first embodiment.

FIG. 3 is a diagram showing an example of the protocol stack and interfaces of the base station according to the first embodiment.

FIG. 6 is a diagram showing an example of a transmission timing of a scheduling request by the message processor according to the first embodiment.

FIG. 8 is a diagram showing an example of a transmission timing of a scheduling request by the message processor according to the second embodiment.

FIG. 9 is a diagram showing an example of a wireless communication system according to a third embodiment.

FIG. 10 is a diagram showing an example of a network configuration of the wireless communication system according to the third embodiment.

FIG. 14A is a diagram for explaining an example of a rotation instruction according to the third embodiment.

FIG. 14B is a diagram for explaining an example of a rotation pair instruction according to the third embodiment.

FIG. 15 is a diagram showing an example of a transmission timing of a scheduling request by the message processor according to the third embodiment.

FIG. 16 is a diagram showing an example of a wireless communication system according to a fourth embodiment.

FIG. 17 is a diagram showing an example of a message processor according to the fourth embodiment.

FIG. 18 explains an example of a protocol stack of the base station according to a fifth embodiment.

FIG. 19 shows an example of the base station according to the fifth embodiment.

FIG. 20 shows a first example of the message processor according to the fifth embodiment.

FIG. 21 shows a second example of the message processor according to the fifth embodiment.

FIG. 22 shows a third example of the message processor according to the fifth embodiment.

FIG. 24 shows a first example of the message processor according to the sixth embodiment.

FIG. 25 shows a second example of the message processor according to the sixth embodiment.

FIG. 26 shows a third example of the message processor according to the sixth embodiment.

FIG. 27 shows an example of the base station according to a seventh embodiment.

FIG. 28 shows a first example of the message processor according to the seventh embodiment.

FIG. 29 shows a second example of the message processor according to the seventh embodiment.

DETAILED DESCRIPTION

Figure 4:
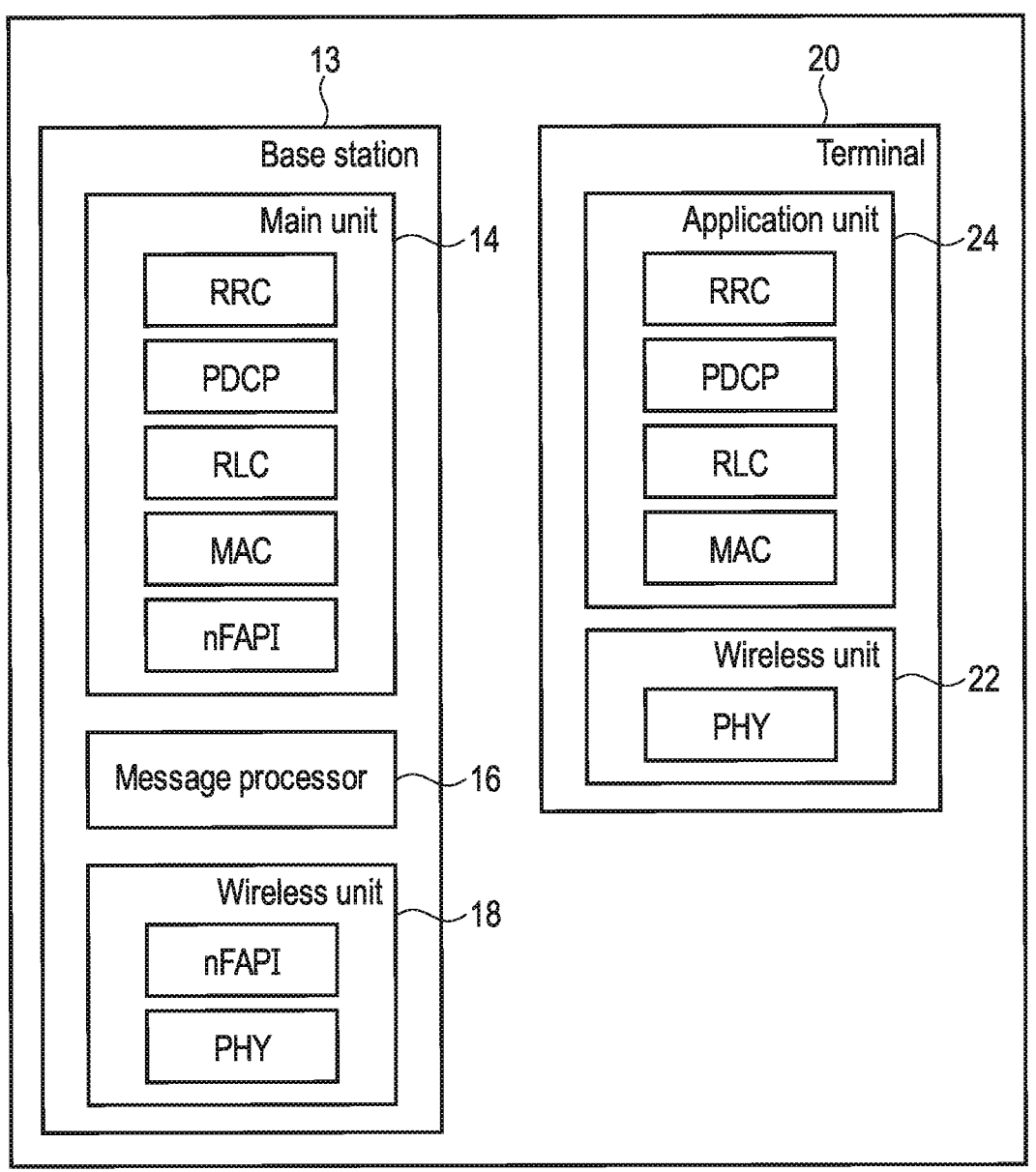
FIG. 4 is a diagram showing an example of the arrangement of a message processor according to the first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic apparatus includes a processor located in an interface which divides layers of the base station into two or more functional units. The processor is configured to receive a first message transmitted from a first layer which is one of a next lower layer and a next upper layer, interpret the first message and transmit an interpreted first message to a second layer which is the other of the next lower layer and the next upper layer, generate a second message based on the interpreted first message, transmit the second message to the second layer, and control timing of transmitting the second message to the second layer.

First Embodiment

FIG. 1 is a diagram showing an example of a wireless communication system according to a first embodiment. The wireless communication system includes an application server 10, a core network 12, a base station 13, and a terminal 20. The terminal 20 executes an application in cooperation with the application server 10. The application server 10 may be located on a cloud or may be located on a physical server. The application server 10 and the terminal 20 are connected via the core network 12 and the base station 13. The terminal 20 transmits data to the application server 10 via the base station 13 and the core network 12. The terminal 20 receives data from the application server 10 via the base station 13 and the core network 12. The terminal 20 and the base station 13 are wirelessly connected to each other. The base station 13 and the core network 12 constitute a network according to a standard such as 4G or 5G. The base station 13 and the core network 12 may constitute a network according to a standard specified after 5G.

The base station 13 is logically divided into two functional units. A message processor 16 is connected between the two functional units. For example, the two functional units are a main unit 14 which is responsible for a MAC layer or higher and communicates with the core network 12, and a wireless unit 18 which is responsible for a PHY layer or lower and communicates with the terminal 20.

The terminal 20 is logically divided into two functional units. For example, the two functional units are a wireless unit 22 which communicates with the base station 13, and an application unit 24 which generates data to be transmitted to the wireless unit 22 and processes data received from the wireless unit 22.

FIG. 2 is a diagram showing an example of the protocol stack of the base station 13 according first embodiment. In the definition of the Third Generation Partnership Project (3GPP) which is an example of mobile communication systems, the base station includes the layers of Radio Resource Control (RRC), Packet Data Convergence Protocol (PDCP), Radio Link Control (RLC), Media Access Control (MAC), and Physical (PHY). Each of the PLC, MAC, and PHY layers may be divided into a higher layer and a lower layer.

FIG. 3 is a diagram showing an example of the protocol stack and Interfaces of the base station according to the first embodiment. Here, the RLC layer is divided into a High RLC layer and a Low RLC layer. The MAC layer is divided into a High MAC layer and a Low MAC layer. The PHY layer is divided into a High PHY layer and a Low PHY layer. Standard interfaces can be located between the layers. An Option 1 to an Option 7 define the interfaces between the layers. The interfaces have been standardized by various organizations. For example, regarding the Option 6, a Small Cell Forum defines an nFAPI interface protocol as an interface between the MAC layer and the PHY layer. Regarding the Option 7, an O-RAN defines an O-RAN 7.2x interface as an interface between the High PHY layer and the Low PHY layer.

FIG. 4 is a diagram showing an example of the arrangement of the message processor 16 according to the first embodiment. The message processor 16 uses the nFAPI interface protocol defined by the Option 6. The main unit 14 includes RRC, PDCP, RLC, and MAC layers. The wireless unit 18 includes a PHY layer. The message processor 16 is connected to the nFAPI interface between the MAC layer and the PHY layer.

The arrangement of the message processor 16 is not limited to this example. An interface protocol such as the O-RAN 7.2x may be used for the arrangement. In this case, the message processor 16 may require an encoder and a decoder corresponding to the higher layer and the lower layer. They may be arranged in a manner similar to that of FIG. 4.

In the nFAPI interface protocol, a device or software of a Virtual Network Function (VNF) which is responsible for the MAC layer or higher constitutes the main unit 14. A device or software of a Physical Network Function (PNF) which is responsible for the PHY Layer or lower constitutes the wireless unlit 18. The VNF and PNF are connected by a socket communication of the nFAPI protocol. In other words, these two types of software may be caused to operate on different two devices or may be caused to operate on the same device. The nFAPI protocol is a protocol for connecting the VNF and the PNF to each other.

The message processor 16 indirectly operates the higher or lower layer by injecting a new control message into the protocol while relaying a message exchanged in the protocol. In an example of the nFAPI interface protocol divided by the Option 6, the higher layer is the VNF, and the lower layer is the PNF. These two layers are connected to each other by the socket communication. The VNF specifies the IP address and port number of the PNF. The PNF specifies the IP address and port number of the VNF. As the message processor 16 is assumed to be inserted between the layers, the message processor 16 changes the IP addresses and port numbers respectively specified for the two layers. Specifically, for a message to be transmitted to the VNF, an IP address and a port number provided by the message processor 16 are specified. For a message to be transmitted to the PNF, an IP address and a port number provided by the message processor 16 are specified. By transmitting a message from the PNF to the VNF as it is, the message processor 16 can cause the VNF to determine that the VNF can be connected to the PNF. By transmitting a message from the VNF to the PNF as it is, the message processor 16 can cause the PNF to determine that the PNF can be connected to the VNF. Thus, neither the VNF nor the PNF recognizes the presence of the message processor 16. The VNF and the PNF recognize that they are connected to each other, and operate as a system without problems. It should be noted that the transmission of the message processor 16 includes the concept of the transmission or transfer of messages. The reception of the message processor 16 includes the reception of messages.

The message processor 16 injects a new message to received messages of a normal protocol in accordance with a rule defined by the normal protocol such as the order of packets. By this operation, neither the higher layer nor the lower layer determines the new message as a message inserted by a message relaying layer (the message processor 16). Both the higher layer and the lower layer process the new message as a message of the normal protocol.

The wireless unit 22 of the terminal 20 includes a PHY layer. The application unit 24 of the terminal 20 includes RRC, PDCP, PLC, and MAC layers.

Figure 5:
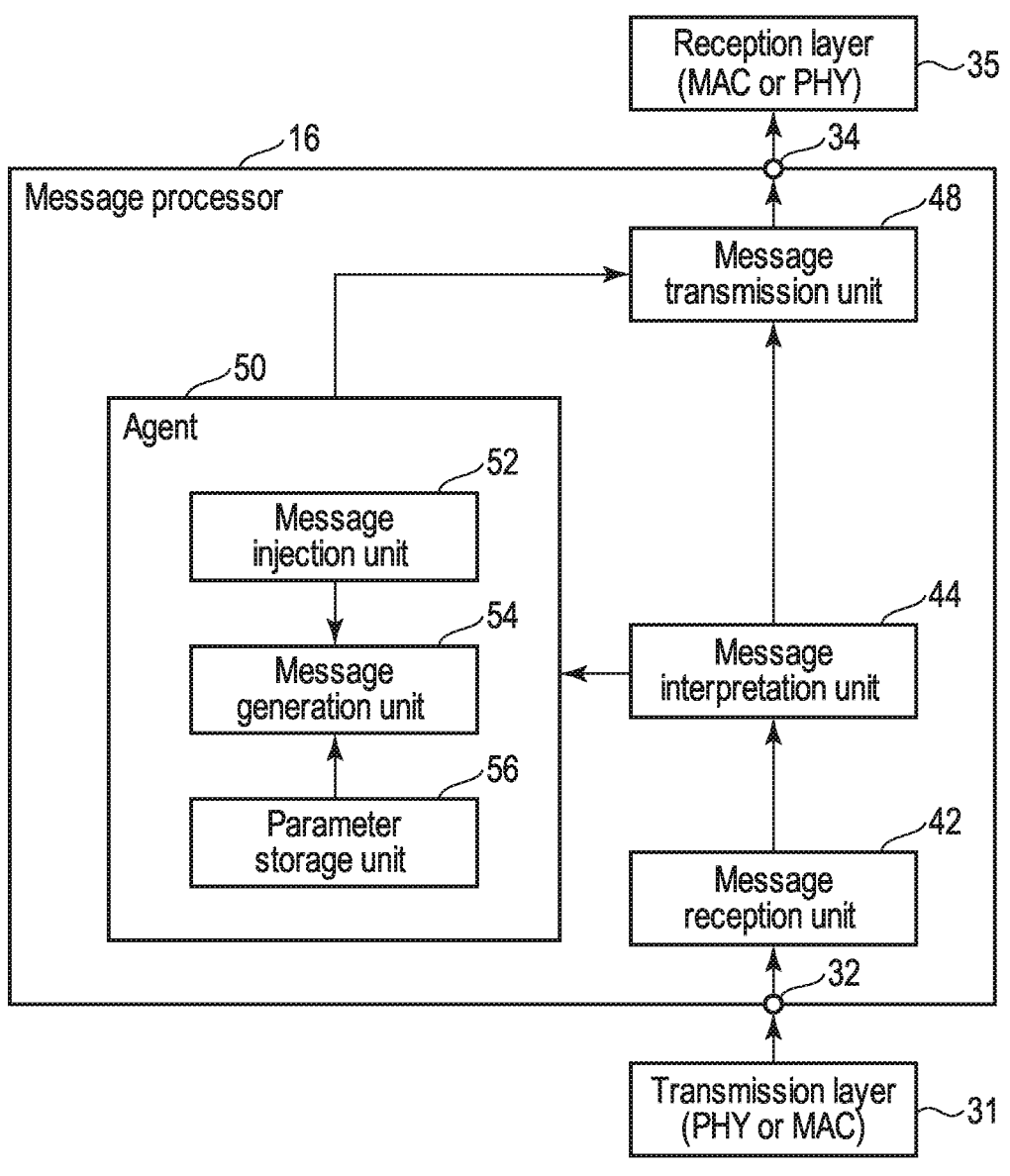
FIG. 5 is a diagram showing an example of the message processor according to the first embodiment.

FIG. 5 is a diagram showing an example of the configuration of the message processor 16 according to the first embodiment. The message processor 16 includes a port 32 connected to a layer (transmission layer) 31 which is the next lower layer or above on the message transmission side (the PHY layer in the case of uplink communication, the MAC layer in the case of downlink communication), a port 34 connected to a layer (reception layer) 35 which is the next layer above or below on the message reception side (the MAC layer in the case of uplink communication, the PHY layer the case of downlink communication), a message reception unit 42, a message interpretation unit 44, a message transmission unit 48 and an agent 50.

The message reception unit 42 receives a message from the transmission layer 31. In the case of uplink communication, an example of a message transmitted from the terminal or the lower layer to the higher layer is a scheduling request from the terminal 20. FIG. 1 shows a single terminal 20. However, a plurality of terminals could be connected to the base station 13. When the plurality of terminals are connected to the base station 13, the terminal 20 refers to a specific terminal of the plurality of terminals. In the case of downlink communication, an example of a message transmitted from the higher layer to the lower layer or the terminal is scheduling information. The message reception unit 42 transmits the received message to the message interpretation unit 44.

The scheduling request is a message by which the terminal 20 requests the base station 13 to allocate a schedule when the terminal 20 would like to transmit data to the base station 13. A scheduler in the MAC layer of the base station 13 which receives a scheduling request allocates a schedule (time) in which communication is enabled to the terminal 20 when the wireless communication resources have a vacancy. The scheduler transmits schedule information indicating the allocated schedule to the terminal 20. The terminal 20 receives the schedule information and transmits data to the base station 13 in accordance with the allocated schedule. An example of the schedule information is a message indicating the allocation of an uplink control channel PUCCH or a message indicating the allocation of an uplink data communication channel PUSCH. The message interpretation unit 44 interprets (parses) the message transmitted from the message reception unit 42 based on the type of the message, and transmits the message to the agent 50 and the message transmission unit 48 with the result of the interpretation.

The agent 50 includes a message injection unit 52, a message generation unit 54, and a parameter storage unit 56. The agent 50 generates a message and transmits the message to the message transmission unit 48. The message transmission unit 48 injects the message generated by the agent 50 into the transmission path of the message received by the message transmission unit 42. From the message processor 16, in addition to the message transmitted from the transmission layer 31, the message generated by the agent 50 is transmitted to the reception layer 35.

The message injection unit 52 controls the time at which the message transmission unit 48 transmits the message generated by the agent 50. For example, in a case where the message generation unit 54 generates a message immediately before the timing of the transmission of the message, and the message transmission unit 48 immediately transmits the message generated h the message generation unit 54 without delay, the message injection unit 52 controls the timing of the transmission of the message by controlling the time at which the message generation unit 54 generates the message. Hereinafter, this specification explains an example in which the message injection unit 52 controls the timing of the transmission of a message by controlling the timing of the generation of the message. The message transmission unit 48 may include a buffer memory which temporarily stores a message generated by the message generation unit 54 until the message is transmitted to the reception layer 35, and the message injection unit 52 may directly control the time at which the message transmission unit 48 transmits the message. The timing of the generation of messages may be controlled for each frame number and slot number stored in the parameter storage unit 56, or may be controlled so as to be arbitrary timing determined in advance. For an uplink communication, an example of a message generated by the message generation unit 54 is a scheduling request equivalent to the scheduling request transmitted by the terminal 20. In the first embodiment, the scheduling request transmitted from the terminal 20 and the scheduling request transmitted from the message processor 16 are transmitted to the scheduler.

A delay time from the transmission of the scheduling request to the reception of the schedule information occupies a large part of the communication delay time in 4G and 5G. A delay is caused as the time at which the terminal 20 waits to receive the schedule information is needed. In addition, a delay is caused as the time at which the terminal 20 can transmit the scheduling request is limited.

The message generation unit 54 generates a message (for example, the scheduling request) in accordance with the timing determined by the message injection unit 52. The message generation unit 54 obtains a necessary parameter from the parameter storage unit 56 when a message is generated. The agent 50 transmits the message generated by the message generation unit 54 to the message transmission unit 48. For a downlink communication, the message generation unit 54 generates a message indicating that a scheduling request can be transmitted. The terminal 20 can transmit the scheduling request in response to reception of the message. In some cases, the terminal 20 can transmit the scheduling request at a certain timing. For example, the terminal 20 can transmit the scheduling request once in two frames. If the message generation unit 54 generates such a message, a frequency of transmitting the scheduling request by the terminal 20 is increased so that a communication delay can be reduced.

The scheduling request may be, in the nFAPI interface, UCI.indication equivalent to the Uplink Control Information (UCI) message of the PHY layer defined by the 3GPP or UL_TTI.request equivalent to the PUCCH message of the PHY layer.

The parameter storage unit 56 extracts a parameter necessary for the generation of a message from a message interpreted by the message interpretation unit 44 and stores the parameter. Examples of the parameters are an identification information Radio Network Temporary Identifier (RNTI) used to identify the terminal 20 in the protocol in the base station 13, and the frame number and slot number of a message exchanged between the main unit 14 and the wireless unit 18 in the base station 13.

The message transmission unit 48 adds a sequence number to the message transmitted from the message interpretation unit 44 and the message transmitted from the agent 50 and transmits the messages with the sequence number to the reception layer 35. The message transmission unit 48 adds a common sequence number to both of the messages to inform the reception layer 35 that the message transmitted from the agent 50 and the message transmitted from the message interpretation unit 44 seem to be messages transmitted from the same transmission layer 31. The sequence number is a communication number connecting the interfaces between the layers and is different from the frame number and slot number which are used when the agent 50 generates the message. For example, the system of the sequence number added to the new message generated by the agent 50 and to be transmitted to the reception layer 35 is different from the system of the sequence number added to the message actually transmitted from the transmission layer 31. Thus, before the new message is transmitted, the sequence number of the new message needs to be converted so as to be continuous with the sequence number of the message transmitted from the transmission layer 31. For example, when the last message transmitted from the transmission layer 31 has the sequence number "3", the message transmission unit 48 adds the sequence number "4" to the message transmitted from the agent 50 to the message transmission unit 48.

The message transmission unit 48 calculates a checksum for a message and adds the result of the calculator of the checksum to the message.

The sequence number added to the message transmitted from the transmission layer 31 does not consider the new message transmitted from the agent 50 to the message transmission unit 48. In this case, similarly, to obtain the consistency of the arrangement of the message from the transmission layer 31 and the message from the agent 50, the message transmission unit 48 changes the sequence number of the message transmitted from the transmission layer 31. In the case of the above example, the sequence number of the message subsequently transmitted from the transmission layer 31 is "4". However, since the sequence number of the message transmitted from the agent 50 to the message transmission unit 48 is "4", the message transmission unit 48 adds the sequence number "5" to the message subsequently transmitted from the transmission layer 31.

In the example of FIG. 5, the message processor 16 includes a plurality of processors (the message reception unit 42, the message interpretation unit 44, the message transmission unit 48, and the agent 50) which realize their respective functions. However, the message processor 16 may include a single processor which realizes a plurality of functions. Similarly, in the example, the agent 50 includes plurality of processors (the message injection unit 52, the message generation unit 54, and the parameter storage unit 56) which realize their respective functions. However, the agent 50 may include a single processor which realizes a plurality of functions. Each of the processors may include one or more CPUs, FPGAs, etc., or may include dedicated hardware. The operation of the message processor 16 may be realized by one or more processors with a program. The processors are connected to a memory which stores a program for causing a CPU to perform the operation of the message processor 16.

FIG. 6 is a diagram showing an example of the transmission timing of a scheduling request by the message processor 16 according to the first embodiment. FIG. 6 shows the case of uplink data communication from the terminal 20 to the base station 13.

Regardless of whether or not the uplink data communication from the terminal 20 occurs, the message processor 16 periodically transmits a scheduling request to the reception layer (MAC layer) 35 of the main unit 14 of the base station 13, using an uplink control channel PUCCH. Thus, the message generation unit 54 periodically generates a scheduling request and transmits the scheduling request to the message transmission unit 48. The message transmission unit 48 transmits the scheduling request to the MAC layer 35.

When the MAC layer 35 receives the scheduling request transmitted from the message processor 16, the MAC layer 35 newly allocates an uplink data communication channel PUSCH to the terminal 20, using the scheduler. The MAC layer 35 allocates an uplink data communication channel PUSCH to a free slot depending on the situation. As an example, here, FIG. 6 shows a case where uplink data communication channels PUSCH are allocated to all free slots. An uplink data communication channel PUSCH is periodically allocated to the terminal 20. In the terminal 20, when the application unit 24 transmits uplink data to the wireless unit 22, the wireless unit 22 performs uplink data communication using the uplink data communication channel PUSCH allocated by the base station 13 and transmits user data to the base station 13.

In the example of FIG. 6, only one terminal 20 is connected to the base station 13. When a plurality of terminals 20 are connected to the base station 13, the message processor 16 allocates an uplink data communication channel PUSCH to each terminal 20. FIG. 6 shows a case where the size of uplink data is a size which can be transmitted by one slot. When the size of uplink data is greater than or equal to a size which can be transmitted by one slot, uplink data communication is continuously performed using the up ink data communication channels PUSCH allocated to a plurality of slots.

In the case of downlink data communication from the base station 13 to the terminal 20, the message processor 16 operates in a manner similar to that of uplink data communication. In the case of downlink data communication, as the scheduler is located in the MAC layer, the message processor 16 does not inject a scheduling request to the PHY layer. The message processor 16 may inject schedule information indicating the allocation of an uplink control channel PUCCH and schedule information indicating the allocation of an uplink data communication channel PUSCH to a message to be transmitted to the lower PHY layer.

According to the first embodiment, in addition to the terminal 20 which transmits a scheduling request, the message processor 16 of the base station 13 transmits a scheduling request independently from the terminal 20. A schedule can be allocated to the terminal 20 before the time at which the application unit 24 of the terminal 20 transmits uplink communication data to the wireless unit 22 of the terminal 20. Therefore, communication delay can be reduced. In the conventional wireless communication system, the delay time from the generation of data to be transmitted in the terminal 20 to the actual transmission of the data from the terminal 20 is not constant, and fluctuation (called jitter) occurs. According to the first embodiment, as an uplink data communication channel PUSCH is allocated at the desired transmission timing, jitter can be reduced.

According to the first embodiment, as the message processor 16 is connected to the standard interface between the layers of the base station 13, a modification to the existing layers is unnecessary. According to the first embodiment, the message processor 16 can transmit a new message using the standard interface between the layers of the base station 13. In a manner different from that of the conventional technique, a new function can be indirectly added to the base station 13 without directly adding a function to the inside of the layers. The conventional technique to reduce delay is the addition of a function to the function and the layers defined by the 3GPP. For example, it is necessary to add a function to the MAC layer which manages the schedule of the inside of the base station or add a function of monitoring the transmission buffer of the terminal. Thus, the conventional technique to reduce delay can be used only by the manufacturers of base stations and terminals. These additional methods cannot be freely used by the developers of applications.

Second Embodiment

The constituent elements of a wireless communication system according to a second embodiment are the same as those of the first embodiment.

Figure 7:
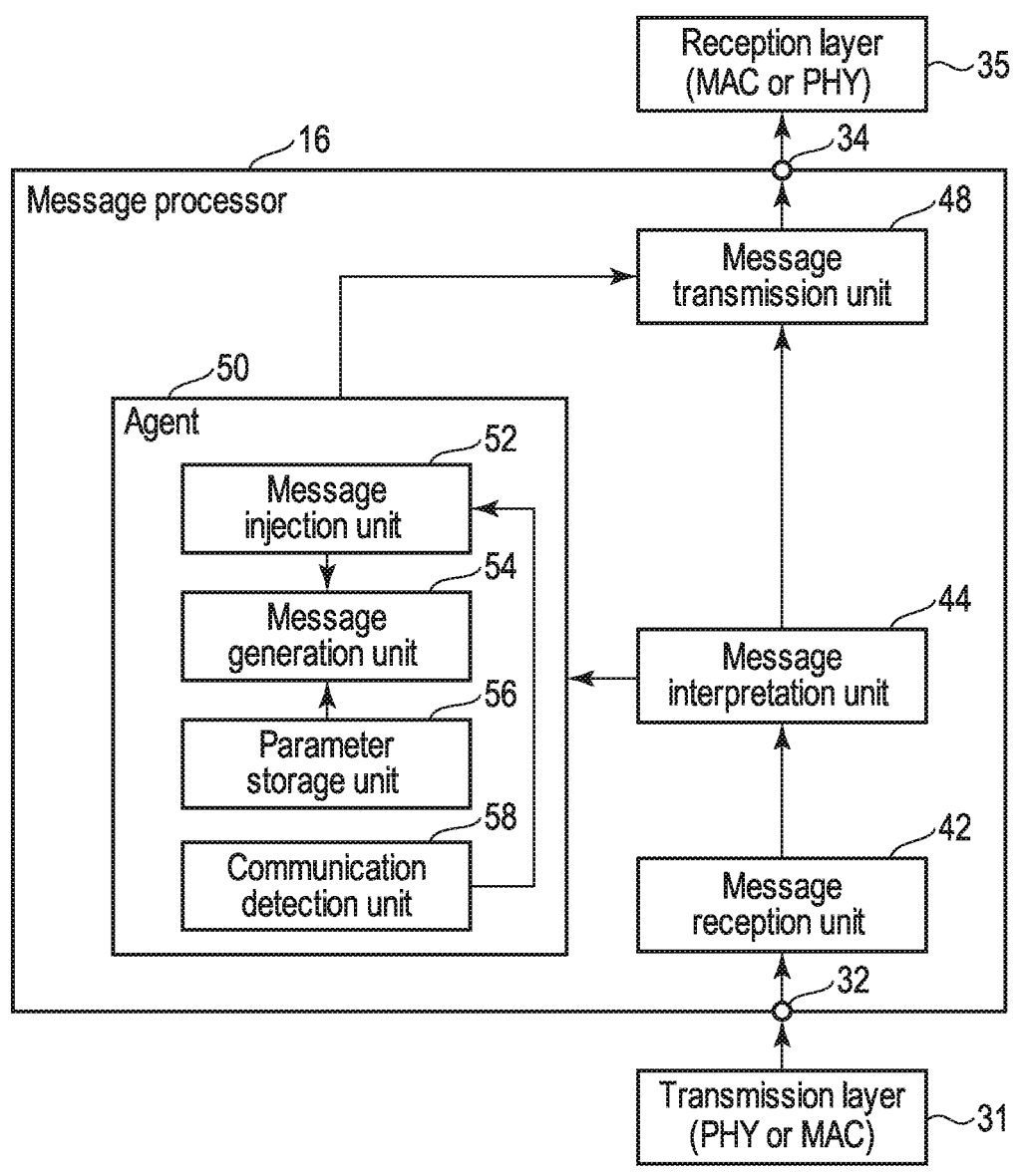
FIG. 7 is a diagram showing an example of the message processor according to a second embodiment.

FIG. 7 is a diagram showing an example of the configuration of the message processor 16 according to the second embodiment. The message processor 16 of she second embodiment is different from that of the first embodiment in respect that the agent 50 includes a communication detection unit 58. When the communication detection unit 58 detects a message transmitted from the terminal 20, the message generation unit 54 generates a message for a period determined in advance and transmits the message to the message transmission unit 48. If data transmission is started from the terminal 20, there is a high possibility that the data transmission continues for a certain time. Therefore, the message processor 16 transmits a scheduling request for a certain period after the communication detection unit 58 detects data transmission. The message processor 16 does not allocate a schedule to terminals other than the terminal of data transmission.

The communication detection unit 58 detects the situation of the transmission and reception of the terminal 20 based on the type of the message flowing through layers. The messages transmitted between the terminal 20 and the base station 13 include data communication, a response of success in data communication, etc., in addition to the scheduling request described in the first embodiment. These messages are transmitted after different message types are added to the messages. The communication detection unit 58 temporarily stores data indicating the situation of the transmission and reception of the messages transmitted from the terminal 20.

The message injection unit 52 controls the time at which the message generation unit 54 generates a message based on the situation of the communication detected in cooperation with the communication detection unit 58. It is assumed that the application server 10 transmits a message to the terminal 20, and the terminal 20 executes an application in which the terminal 20 performs a process based on the message and transmits the result of the process to the application server 10. The message in unit 52 transmits a scheduling request for a certain period such that the terminal 20 can immediately transmit the result of the process to the application server 10. Specifically, in a case where data communication from the application server 10 to the terminal 20 is started, when the communication detection unit 58 detects a message flowing from the higher layer to the lower layer, in place of the terminal 20, the message generation unit 54 transmits a scheduling request to the higher layer for a certain period such that the terminal 20 which is the transmission destination of data can immediately transmit the result of the process. The certain period changes depending on the application. This configuration allows the terminal 20 to immediately perform data communication with the application server 10 by using the schedule allocated by the scheduling request transmitted by the message processor 16 in place of the terminal 20.

When the terminal 20 transmits data to the base station 13, the terminal 20 is expected to intermittently transmit the data after waiting for a response from the application server 10. For example, when the matter in which the terminal 20 transmits data B after the application transmits data A is determined as the protocol of the application, the terminal 20 waits for a response (data A) from the application server 10. For this reason, when the terminal 20 transmits a scheduling request in each case, a communication delay easily occurs. In the second embodiment, the communication from the lower layer to the higher layer can be also detected. Therefore, when the message processor 16 transmits a scheduling request for a certain period in place of the terminal 20, the delay can be reduced for the intermittent operation.

FIG. 8 is a diagram showing an example of the transmission timing of a scheduling request by the message processor 16 according to the second embodiment. FIG. a shows uplink data communication from the terminal 20 to the base station 13.

When uplink data communication occurs from the terminal 20, the message processor 16 transmits a scheduling request to the MAC layer 35 of the main unit 14 of the base station 13, using an uplink control channel PUCCH, for a certain period. Thus, the message generation unit 54 generates a scheduling request for a certain period and transmits the scheduling request to the message transmission unit 48. The message transmission unit 48 transmits the scheduling request to the MAC layer 35.

The MAC layer 35 allocates an uplink data communication channel PUSCH to the terminal 20 based on the scheduling request for a certain period. An uplink data communication channel PUSCH is allocated to the terminal 20 for a certain period. The terminal 20 transmits user data to the base station 13 by using the uplink data communication channel PUSCH allocated by the scheduler of the MAC layer 35.

In the example of FIG. 8, only one terminal 20 is connected to the base station 13. When a plurality of terminals 20 are connected to the base station 13, the message processor 16 allocates an uplink data communication channel PUSCH to each terminal 20.

In a manner similar to that of the first embodiment, in the case of downlink data communication from the base station 13 to the terminal 20, the message processor 16 operates in a manner similar to that of uplink data communication and can inject a message to a downlink.

According to the second embodiment, if data transmission is started, there is a high possibility that the data transmission continues for a certain time. Therefore, the message processor 16 of the second embodiment transmits a scheduling request for a certain period after data transmission is detected. In this configuration, a schedule is not allocated to terminals other than the terminal of data transmission, thereby effectively allocating a schedule to the terminal of data transmission. In other words, the wireless communication system of the first embodiment performs the operation of a delay reduction mode at all times for all of the terminals connected to the base station. The wireless communication system of the second embodiment performs the operation of a delay reduction mode for a certain period for only the terminal in which communication occurs. In addition, jitter can be reduced.

Third Embodiment

FIG. 9 is a diagram showing an example of a wireless communication system according to a third embodiment. The constituent elements of the wireless communication system are the same as those of the first embodiment. However, the third embodiment is different from the first embodiment in respect that the application server 10 transmits timing information 104 a related to the communication timing of the terminal 20 to the base station 13 or the terminal 20 transmits timing information 104b related to the communication timing of an application client to the base station 13.

In the third embodiment, an application can detect in advance the time at which communication occurs from the terminal 20. Regarding the application which can detect the timing, the following three examples are considered.

A first example is an application for periodic regular communication. For example, in an application which transmits sensor data obtained from a sensor, etc., from the terminal 20 to the application server 10, the terminal 20 transmits the sensor data in a cycle determined in advance. Thus, the terminal 20 can predict the occurrence of communication and transmit this information to the message processor 16 as the timing information 104*b*.

A second example is an application in which the application server 10 requests each terminal 20 to perform data communication. For example, in an application which obtains sensor data, the terminal 20 may transmit the sensor data in a predetermined cycle, or the terminal 20 may transmit the sensor data when the application server 10 requests transmission. In the latter case, when the application server 10 transmits a transmission request to a plurality of terminals 20 in series, the application server 10 determines the terminal 20 to be the next transmission destination. Thus, before starting communication, the application server 10 can transmit such information as the timing information 104 *a* to the message processor 16.

A third example is an application client which simulates a token ring between the terminals 20. In this case, the terminals which perform communication are determined in advance such as a first terminal, a second terminal, a third terminal and so on. The application server 10 knows in advance that the terminal for communication after the detection of the communication of the first terminal is the second terminal. Thus, the application server 10 can transmit this information to the message processor 16 as the timing information 104 *a*.

All of the three examples allow the reduction in the delay when the terminal 20 is switched by starting the process of allocating a schedule before communication based on the timing information.

The communication timing may be grasped on the application server 10 side or may be grasped on the terminal 20 side. FIG. 10 is a diagram showing an example of the network configuration of the wireless communication system according to the third embodiment. The network includes two networks, specifically, an inside base station network 106 and an outside base station network 108. The inside base station network 106 connects the wireless unit 18, message processor 16, main unit 14 and core network 12 to each other. The outside base station network 108 connects the message processor 16, core network 12 and application server 10 to each other. The application server 10 transmits the timing information 104 *a* to the message processor 16 via the outside base station network 108. The terminal 20 transmits the timing information 104*b* to the message processor 16 via the base station 13, core network 12 and outside base station network 108. In a case where the communication time is predetermined, when the timing is informed in advance, allocation is performed without waiting for allocation by a scheduling request at the time of data transmission. Thus, it is possible to reduce the delay from the generation of transmission data by the application client to the actual transmission.

Figure 11:
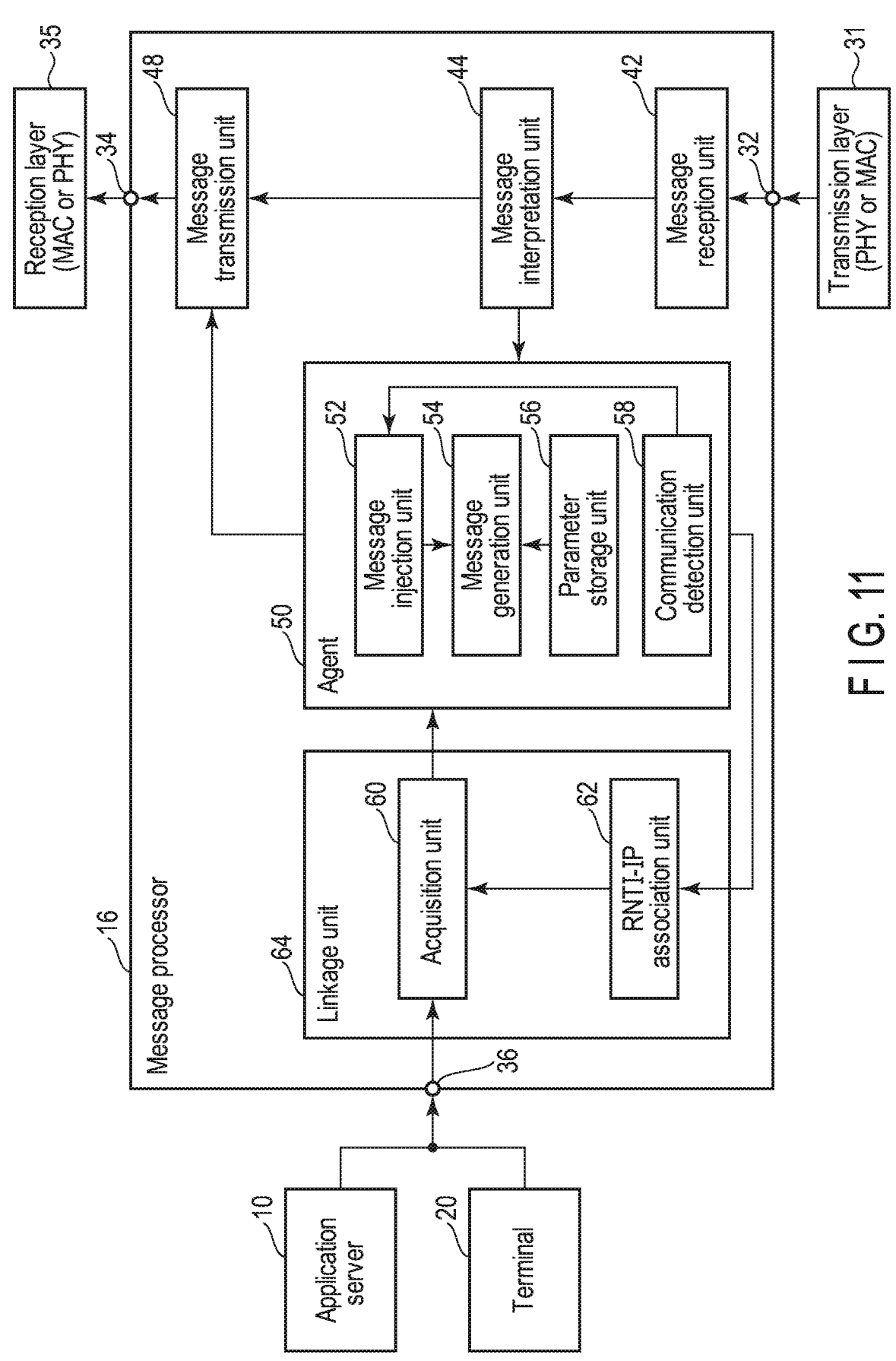
FIG. 11 is a diagram showing an example of a message processor according to the third embodiment.

FIG. 11 is a diagram showing an example of the configuration of the message processor 16 according to the third embodiment. The message processor 16 of the third embodiment is different from that of the second embodiment in respect that the message processor 16 of the third embodiment includes a port 36 and a linkage unit 64. The linkage unit 64 includes an acquisition unit 60 and an RNTI-IP association unit 62. The port 36 is connected to the outside base station network 108. The timing information 104 *a* from the application server 10 or the timing information 104*b* from the terminal 20 is input to the acquisition unit 60 via the port 36. The acquisition unit 60 obtains the timing information 104 *a* or 104*b* and transmits the timing information 104 *a* or 104*b* to the agent 50. The RNTI-IP association unit 62 stores an association information for an identification information RNTI of the terminal 20 used in the protocol inside the base station 13 and the IP address of the terminal 20.

The message processor 16 mainly provides two services to cooperate with an external application. A first service includes the registration, display of a list and deletion of timing information. A second service is related to information regarding the terminal 20. The second service includes the display of the information. The second service further includes the registration, change, and display of statistical information and the combination of RNTI and IP addresses. The statistical information is related to allocation of schedule and data communication, Examples of the Liming information are an instruction for the start and termination times and a period, an instruction for immediate start and termination, an automatic instruction, a rotation instruction and a rotation pair instruction.

Figures 12, 13:
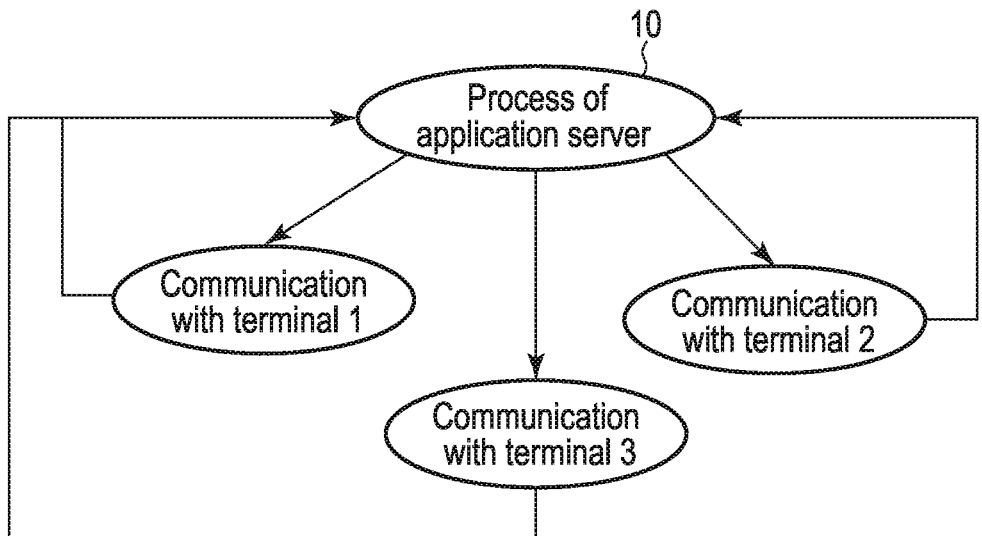
FIG. 12 is a diagram for explaining an example of periodic message transmission in the third embodiment.
FIG. 13 is a diagram for explaining an example of an application server of the third embodiment.

FIG. 12 is a diagram for explaining an example of periodic message transmission in the third embodiment. An example of periodic message transmission is the transmission of sensor data. In the example of FIG. 12, terminal 1 transmits sensor data in a cycle of two periods of period T1, period T3, period T5, period T7 and so on. Terminal 2 transmits sensor data in a cycle of three periods of period T3, period T6 and so on. Terminal 3 transmits sensor data in a cycle of three periods of period T2, T5, and so on.

FIG. 13 is a diagram for explaining an example in which the application server 10 of the third embodiment determines the terminal 20 to be the next communication destination.

When the communication time is predetermined as shown in FIG. 12 or FIG. 13, timing information is the instruction for the start and termination times and the period. The timing information of the instruction for the start and termination times includes a message type, an IP address, a start time, a termination time, and a cycle for transmitting a scheduling request. The timing information of the instruction for the period includes a message type, an IP address, a start time, a termination time, and a cycle for transmitting a scheduling request. The timing information of the instruction for the period may include a period for transmitting a scheduling request.

The timing information which requests immediate allocation and requests immediate cancel of allocation is the instruction for immediate start and termination. The timing information of the instruction for immediate start includes a message type, an IP address, and a cycle for transmitting a scheduling request. The timing information of the instruction for immediate termination includes a message type and an IP address.

When a downlink is monitored and a corresponding RNTI is present, the timing information for allocating a schedule for a specified period is the automatic instruction. Here, it is assumed that a schedule is allocated to all terminals by a setting file. The timing information of the automatic instruction includes a message type, an IP address, a period for transmitting a scheduling request and a cycle for transmitting a scheduling request.

FIG. 14A is a diagram for explaining an example of the rotation instruction according to the third embodiment. For example, the order of communicating with terminal 1, terminal 2 and terminal 3 is determined such that the base station communicates with terminal 1 (#1), subsequently communicates with terminal 2 (#2) and subsequently further communicates with terminal 3 (#3). In this case, the timing information is the rotation instruction. The timing information of the rotation instruction includes a message type, an IP address indicating the order of rotation and a cycle for transmitting a scheduling request.

FIG. 14B is a diagram for explaining an example of a rotation pair instruction according to the third embodiment. For example, the order of communicating with pairs of terminals is determined such that the base station communicates with a pair of terminals 1 and 2 (#1) and subsequently communicates with a pair of terminals 2 and 3 (#2). In this case, the timing Information is the rotation pair instruction. The timing information of the rotation pair instruction includes an IP address indicating the order of rotation of pairs and a cycle for transmitting a scheduling request.

The timing information may be described in a JSON format or a binary format.

The agent 50 operates based on the timing information obtained in the acquisition unit 60. For example, when the agent 50 receives the timing information of the instruction for immediate start and termination, the agent 50 refers to the RNTI-IP association unit 62, obtains the RNTI having the target IP address from the RNTI-IP association unit 62, and generates a necessary message. The agent 50 transmits the message to the message transmission unit 48 at the time specified by the timing information.

When the agent 50 receives the timing information of the automatic instruction and the rotation instruction, the agent 50 uses the communication detection unit 58 and generates a message based on the message of the terminal 20 of the RNTI having the specified IP address. The agent 50 transmits the message to the message transmission unit 48 at the time specified by the timing information.

Regarding the service related to the terminal 20, the message processor 16 can display and register the combination of RNTI and IP address. An RNTI is the identification number of a device used in the communication between the terminal 20 and the base station 13. An IP address is the identifier of a device used in an application. This combination is managed in the RNTI-IP association unit 62.

The RNTI-IP association unit 62 manages the combination of RNTI and IP address. In a message relayed between a higher layer and a lower layer, a device is identified by an RNTI. In an application, a device is identified by an IP address. Therefore, a process for associating an RNTI with an IP address is required.

Regarding a method of this associating process, three examples are shown below. The message processor 16 is assumed to be able to present the combination of RNTI and IP address to a user through the setting screen of the terminal 20. An example of the presentation is {<RNTI>: "IP address"}. When the IP address is unknown, field of the IP address is blank.

{0x1234: "12.1.1.100", 0x201E: "12.1.1.102", 0x2258: " "}

A first method is a method of association with confirmation of an RNTI and an IP address by the manual input of a user. When a new terminal 20 is connected to the base station 13, the message processor 16 detects the RNTI of the new terminal 20 from the message relayed by the base station 13. The base station 13 issues an IP address for communication to the terminal 20. The user can confirm the IP address from, for example, the setting screen of the terminal 20. The message processor 16 obtains the combination of RNTI and IP address from the RNTI-IP association unit 62 by the acquisition unit 60. The message processor 16 displays the combination of RNTI and IP address on the setting screen of the terminal 20. When an RNTI in which an IP address is not registered is present in this display, the user manually inputs the IP address confirmed by the setting screen to the terminal 20. The input IP address is transmitted to the RNTI-IP association unit 62. The combination of the RNTI and the IP address is registered.

For example, when the user of the terminal 20 confirms that a new terminal 20 is connected to the base station 13, the user confirms the IP address "12.1.1.104" of the new terminal 20 on the setting screen of the terminal 20 of the user. The user inquires of the message processor 16 an RNTI through the setting screen. The user confirms the RNTI of the terminal which is newly registered. When a plurality of terminals are connected, the user confirms the order of RNTIs from the connection order of the terminals 20. The RNTI of the terminal which is newly registered is assumed to be 0x225B. The user registers the combination of RNIT and IP address {0x225B: "12.1.1.104"} through the setting screen of the terminal 20.

A second association method is an automatic specification method by a system. When the message processor 16 detects a new RNTI from a relayed message, the message processor 16 executes a PING command for inquiring the confirmation of presence of an IP address to be allocated with an Internet Control Message Protocol (ICMP) packet. The message processor 16 determines that an IP address in which a response by the PING command can be confirmed is the device having the RNTI which is newly issued.

For example, when the message processor 16 detects a new RNTI, the message processor 16 executes a PING command relative to all of the IP addresses in the range determined in advance by the base station. An IP address in which a response is newly returned by the PING command is registered as the IP address of the new RNTI.

A third association method is a method of sending inquiries to the core network 12 which directly manages the RNTI and IP address. The core network 12 is formed of plurality of instances including the management of the connected terminal 20. By directly sending inquiries to this instance, the combination of RNTI and IP address of the device which is currently connected may be obtained.

FIG. 15 is a diagram showing an example of the transmission timing of a scheduling request by the message processor 16 according to the third embodiment. FIG. 15 shows uplink data communication from the terminal 20 to the base station 13.

The message processor 16 grasps in advance the time at which the terminal 20 transmits data based on the timing information 104 *a* or 104b. The message processor 16 periodically transmits a scheduling request to the MAC layer 35 of the main unit 14 of the base station 13 by using an uplink control channel PUCCH before the terminal 20 transmits data such that a schedule is already allocated to the terminal 20 at the time the terminal 20 transmits data. A message generation unit 54 periodically generates a scheduling request and transmits the scheduling request to the message transmission unit 48. The message transmission unit 48 transmits the scheduling request to the MAC layer 35.

The MAC layer 35 allocates an uplink data communication channel PUSCH to the terminal 20 by using the scheduler based on the scheduling request. The terminal 20 performs uplink data communication by using the uplink data communication channel PUSCH allocated by the base station 13 and transmits user data to the base station 13.

In a manner similar to that of the first embodiment, in the case of downlink data communication from the base station 13 to the terminal 20, the message processor 16 operates in a manner similar to that of uplink data communication and can inject a message to a downlink.

According to the third embodiment, the message processor 16 can immediately allocate a schedule when the server 10 which cooperates with the application of the terminal 20 notifies the message processor 16 of the transmission timing from the terminal 20. Thus, data can be transmitted with a minimum delay. In addition, litter can be reduced.

Fourth Embodiment

In a fourth embodiment, the agent 50 controls flowing messages and data based on the information obtained by the acquisition unit 60. In the fourth embodiment, in a manner different from that of the third embodiment, terminals can be prioritized regarding the reduction in the delay of data communication. When a delay reduction process is evenly performed for all terminals such that a schedule is evenly allocated to the terminals, there is a possibility that the delay cannot be reduced regarding a terminal in which the frequency of data communication is high. In the fourth embodiment, the performance of the delay reduction process of a terminal can be prioritized over that of another terminal. The level of this prioritization is referred to as a priority. The number of priorities may be two, or may be three or more. The two priorities indicate to prioritize and not to prioritize. First, a case where the number of priorities is two is explained. (1) An application server 10 specifies a terminal 20 in which the reduction in the delay of data communication should be prioritized and a terminal 20 in which the reduction in the delay of data communication should not be prioritized. (2) The application server 10 notifies a message processor 16 of filter information indicating the specified terminal in which the reduction in delay should be prioritized and the execution timing of the reduction in delay. (3) The message processor 16 shuts off the message transmitted from the transmission layer to the reception layer 35 based on the filter information. (4) The message processor 16 changes the order of the messages transmitted from the transmission layer 31 to the reception layer 35 based on the filter information.

FIG. 16 is a diagram showing an example of the wireless communication system according to the fourth embodiment. Although the constituent elements of the wireless communication system are the same as those of the first embodiment, the fourth embodiment is different from the first embodiment in respect that information 110 related to the communication of an application client and the operation of messages transmitted by the message processor 16 is transmitted from the application server 10 to the base station 13.

FIG. 17 is a diagram showing an example of the configuration of the message processor 16 according to the fourth embodiment. In the message processor 16 of the fourth embodiment, a filter unit 46 is added to the message processor 16 of the third embodiment. The agent 50 transmits timing information 47 to the message transmission unit 48 and transmits filter information 49 to the filter unit 46.

The linkage unit 64 provides the function explained in the third embodiment.

The acquisition unit 60 obtains the timing information explained in the third embodiment and receives filter information for the filter unit 46 from the application server 10 and the terminal 20.

Examples of the filter information are an instruction for a prioritization start and a prioritization termination related to a terminal 20 which should be prioritized regarding a delay reduction process, an instruction for an immediate execution of prioritization related to a terminal 20 which should be prioritized, an instruction for a filter start and a filter termination related to a terminal 20 which should not be prioritized regarding a delay reduction process and an instruction for an immediate execution of filtering related to a terminal 20 which should not be prioritized.

The filter information of the instruction for a prioritization start and a prioritization termination includes a message type, an IP address of a terminal which should be prioritized and a start time and termination time of a prioritization process. The filter information of the instruction for a prioritization start and a prioritization termination may include the message type, the IP address, and the start time and an execution period of the prioritization process. The prioritization process is a process of prioritizing the allocation of the terminal over the allocation of another terminal.

The filter information of the instruction for the immediate execution of prioritization includes a message type and an IP address. The message type includes an immediate execution start and an immediate execution stop of the prioritization process.

The filter information of the instruction for a filter start and a filter termination includes a message type, an IP address and a start time and a termination time of a filter process. The filter information or the instruction for a filter start and a filter termination may include the message type, the IP address, and the start time and an execution period of the filter process. The filter process is a process of shutting off the transmission of a scheduling request related to the terminal.

The filter information of the instruction for an immediate execution of filtering includes a message type and an IP address. The message type includes an immediate execution start and an immediate execution stop of the filter process.

Second, a case where the number of priorities is three or more is explained. For example, when the number of priorities is three, a terminal having priority 1 may be caused to perform a delay reduction process a first number of times or at a first frequency, and a terminal having priority 2 may be caused to perform a delay reduction process a second number of times less than the first number of times or at a second frequency less than the first frequency, and a terminal having priority 3 may be caused to perform a delay reduction process a third number of times less than the second number of times or at a third frequency less than the second frequency. The terminal having priority 3 may not perform a delay reduction process. (1) The application server 10 determines the priority of each terminal 20. (2) The application server 10 notifies the message processor 16 of filter information indicating identification information of the terminals 20, the priorities, and the execution timings of the reduction in delay. (3) The message processor 16 shuts off the message transmitted from the transmission layer 31 to the reception layer 35 based on the filter information. (4) The message processor 16 changes the order of the messages transmitted from the transmission layer 31 to the reception layer 35 based on the filter information.

In the above explanation, since the filter information is related to terminals having a high priority, when the number of priorities is two, the filter information does not include the priority. However, the filter information may include the priority when the number of priorities is two. In this case, the format of the filter information can be shared regardless of the number of priorities.

The filter unit 46 is controlled based on the filter information which is received in the acquisition unit 60 by the agent 50. When the filter unit 46 receives the filter information related to the prioritization process, the filter unit 46 prioritizes the transmission of a scheduling request related to a terminal 20 which should be prioritized over the transmission of a scheduling request related to another terminal. The start, termination, and execution period of prioritization process are specified by the filter information. The filter unit 46 may shut off the data communication with terminals other than the terminal 20 which should be prioritized depending on a situation.

When the filter unit 46 receives the filter information related to the filter process, the filter unit 46 shuts off or intermittently shuts off the transmission of a scheduling request related to a terminal 20 which should not be prioritized. The start, termination, and shut-off period of a shut-off process are specified by the filter information. The filter unit 46 also shuts off or intermittently shuts off the data communication with a terminal 20 which should not be prioritized depending on a situation.

The filter unit 46 can switch the message related to a terminal 20 which should be prioritized by performing the queuing process of the relayed messages. For example, the filter unit 46 includes a buffer memory which temporarily stores a message received from the transmission layer 31. When the filter unit 46 reads a message from the buffer memory, the filter unit 46 may notify the reception layer 35 of a message transmitted from a terminal 20 which should be prioritized so as to be prioritized over a message transmitted from another terminal. The filter unit 46 may notify the reception layer 35 of a message to be transmitted to a terminal 20 which should be prioritized so as to be prioritized over a message to be transmitted to another terminal. At this time, the message transmission unit 48 maintains consistency as a protocol by obtaining the frame/slot number of the latest message detected by the agent 50 depending on a need and adjusting the frame/slot number of the message to be transmitted.

The filter unit 46 applies the same process as messages to communication data. The filter unit 46 processes uplink messages and data and further processes downlink messages and data in the same manner. For example, when the filter unit 46 shuts off the allocation message of an uplink control channel PUCCH and the allocation message of an uplink data communication channel PUSCH transmitted to the lower layer, the filter unit 46 can invalidate the allocation of the uplink control channel PUCCH and the allocation of the uplink data communication channel PUSCH. Thus, the message processor 16 can allocate a schedule to a terminal 20 which should be truly prioritized such that the terminal 20 is prioritized.

In the fourth embodiment, the transmission of a scheduling request to a terminal which should be prioritized is prioritized, thereby reducing communication delay and also reducing jitter. In a manner similar to that of the first embodiment, in the case of downlink data communication from the base station 13 to the terminal 20, the message processor 16 operates in a manner similar to that of uplink communication and can inject a message to a downlink.

Fifth Embodiment

FIG. 18 explains an example of a protocol stack of the base station 100 according to the fifth embodiment. The base station 100 comprises an RRC layer 112, a PDCP layer 114, a High RLC layer 116, a Low RLC layer 118, a High MAC layer 120, a Low MAC layer 122, a High PHY layer 124, and Low PHY layer 126. The base station 100 is divided in three function units.

A function unit 106 processing a radio frequency (RF) signal is called RU (Radio Unit). The RU 106 comprises the High PHY layer 124 and the Low PHY layer 126.

The function unit processing a signal except the RF signal is further divided into a DU (Distributed Unit) 104 and a CU (Centralized Unit) 102. The DU 104 includes the High RLC layer 116, the Low RLC layer 118, the High. MAC layer 120, and the Low MAC layer 122. The CU 102 includes the RRC layer 112 and the PDCP layer 114.

FIG. 19 shows an example of the base station 100 according to the fifth embodiment. The base station 100 includes the CU 102, the DU 104, and the RU 106. The CU 102 communicates with the core network 12. The RU 106 communicates with the terminal 20. The DU 104 comprises a message processor 130. The message processor 130 implements the function that is similar to the message processor 16. The message processor 130 injects a message to an uplink based on an uplink message from the RU 106 to the CU 102. The message processor 130 injects a message to a downlink based on a downlink message from the CU 102 to the RU 106. In the similar manner as the third embodiment of FIG. 9, timing information 204 *a* is transmitted from the application server 10 to the message processor 130. The timing information 204 *a* relates to a communication timing of the terminal 20. Timing information 204*b* is transmitted from the terminal 20 to the message processor 130. The timing information 204*b* relates to a communication timing of an application client.

FIG. 20 shows a first example of the message processor 130 according to the fifth embodiment. The message processor 130 is connected to the Low MAC layer 122. The Low MAC layer 122 interprets a Low MAC message transmitted from the RU 106 and transmits an interpretation result to the High MAC layer 120 and the message processor 130. The Low MAC layer 122 interprets a Low MAC message transmitted from the High MAC layer 120 and transmits an interpretation result to the RU 106 and the message processor 130. The Low MAC includes a scheduler.

The message processor 130 includes a message reception unit 132 for receiving an interpretation result of the Low MAC layer 122, an agent 136 for generating a message, a message transmission unit 134 for transmitting the generated message to the Low MAC layer 122, a linkage unit 142.

The agent 136 implements a function like the agent 50 shown in the FIG. 7, and includes a message injection unit 152, a message generation unit 154, a parameter storage unit 156, and a communication detection unit 158.

The communication detection unit 158 detects the message transmitted from the terminal 20. The message generation unit 154 generates a message for a predetermined period of time and transmits the message to the message transmission unit 134. When the terminal 20 starts data communication, it is expected that the data communication continues for a while. When the communication detection unit 158 detects the message, the message processor 130 transmits the scheduling request for a certain period of time. The message injection unit 152 controls a message generation timing of the message generation unit 154 based on a state of communication detected by using the communication detection unit 158.

The parameter storage unit 156 extracts a parameter required to generate a message and stores the extracted message. An example of the message is RNTI (Radio Network Temporary Identifier), and a frame number and a slot number of a message communicated in the base station 100. The RNTI is used for identifying the terminal 20 in a protocol the base station 100.

The linkage unit 142 implements a function like the linkage unit 64 (FIG. 11) of the third embodiment, and includes an acquisition unit 144 and an RNTI-IP association unit 146. The linkage unit 142 detects a communication generation timing of the terminal 20 and starts a scheduling before the terminal 20 starts communication. Therefore, a delay time occurred in switching the terminal 20 can be reduced. The same operation explained with reference to FIG. 12 to FIG. 15 can be applied to the fifth embodiment. The DU 104 includes a port 138 for connecting the linkage unit 142 to the application server 10 and the terminal 20.

The message reception unit 132 receives an interpretation result 122a from the Low MAC layer 122. An example of the interpretation result 122a of an uplink message is {RNTI:"0123", FRAME:X, SLOT:Y, DATA_TYPE:UP, DATA_SIZE:300}. RNTI represents an identification number the terminal 20. FRAMA is a frame number of the message. SLOT is a slot number of the message. DATA_TYPE represents that the message is an uplink message (UP) or a downlink message (DOWN). DATA_SIZE is a size of the message. The interpretation result 122a indicates that a downlink communication for a message of 300 bytes is assigned to the terminal 20 with an identification number "0123". An example of the interpretation result 122a of a downlink message is {RNTI:"0123", FRAME:X, SLOT:Y, DATA_TYPE:DOWN, DATA_SIZE: 300}.

The agent 136 generates a new message 136 a based on the interpretation result 122a and transmits the message 136 a to the Low MAC layer 122. An example of an uplink message 136 a is {RNTI:"0123", STATUS:"start"}. The message 136 a starts a delay reduction process for the terminal 20 with an identification number "0123".

In a manner similar to that of the second embodiment shown in FIG. 7, the message injection unit 152 controls a message generation timing of the message generation unit 154 based on a status of communication detected by the communication detection unit 158. In a manner similar to that of the acquisition unit 60 shown in FIG. 11, the acquisition unit 144 detects a data communication timing of the terminal 20 beforehand. In a manner similar to that of the second embodiment shown in FIG. 7, the message injection unit 152 controls a message generation timing of the message generation unit 154 based on the timing detected by the acquisition unit 144. Thus, the agent 136 transmits the message 136 a to the Low MAC layer 122 before the terminal 20 transmits data.

When the Low MAC layer 122 receives the message 136 a, the Low MAC layer 122 activates a scheduler. The scheduler assigns a communication resource to the terminal 20 with an identification number "0123". Thus, the scheduler assigns a communication resource to the terminal 20 before the terminal 20 transmits data, thereby reducing the delay time. The message 136 a is equivalent to the scheduling request transmitted by the terminal 20.

According to the first example of the fifth embodiment, the message processor 130 injects a message equivalent to the scheduling request transmitted by the terminal 20 into the Low MAC layer 122 in the DU 104. The scheduler assigns a communication resource to the terminal 20 before the terminal 20 transmits data. Therefore, the delay time between a data generation timing of the terminal 20 and a data transmission timing of the terminal 20 is reduced and a delay reduction process is performed.

In the example of FIG. 20, the message processor 130 includes a plurality of processors (the message reception unit 132, the message transmission unit 134, the agent 136, and the linkage unit 142) which realize their respective functions. However, the message processor 130 may include a single processor which realizes a plurality of functions. Similarly, in the example, the agent 136 and the linkage unit 142 respectively include a plurality of processors which realize their respective functions. However, the agent 136 and the linkage unit 142 may respectively include a single processor which realizes a plurality of functions. Each of the processors may include one or more CPUs, FPGAs, etc., or may include dedicated hardware. The operation of the message processor 130 may be realized by one or more processors with a program. The processors are connected to a memory which stores a program for causing a CPU to perform the operation of the message processor 136.

FIG. 21 shows a second example of the message processor 130 according to the fifth embodiment. FIG. 21 shows an example of injecting a message into an uplink. The second example is different from the first example in that the message processor 130 of the second example does not include the message reception unit 132 and further includes a message interpretation unit 160. The message reception unit 132 is connected to an uplink between the RU 106 and the Low MAC layer 122. The message reception unit 132 transmits an uplink Low MAC message from the RU 106 to the Low MAC layer 122 and the message processor 130. If the message processor 130 injects a message into a downlink, the message reception unit 132 is connected to an uplink between the High MAC layer 120 and the Low MAC layer 122. The message reception unit 132 transmits a downlink Low MAC message from the High MAC layer 120 to the Low MAC layer 122 and the message processor 130.

The message transmitted to the message processor 130 is input to the message interpretation unit 160. The message interpretation unit 160 interprets the message 132a from the message reception unit 132 and transmits an interpretation result 160a to the agent 136. An example of the message 132a is {RNTI:"0123", FRAME:X, SLOT:Y, MAC_PAYLOAD="01230123 . . . "}. MAC_PAYLOAD represents a payload of the MAC message. An example of the interpretation result 160a is {RNTI:"0123", FRAME:X, SLOT:Y, DATA_TYPE:UP, DATA_SIZE:300} which is the same as the interpretation result 122a of FIG. 20.

The agent 136 generates a new message 136a based on the interpretation result 160a and transmits the message 136 a to the Low MAC layer 122. An example of the message 136 a is {RNTI:"0123", STATUS:"start"} which is the same as the message 136 a of FIG. 20.

When the Low MAC layer 122 receives the message 136 a, the Low MAC layer 122 activates a scheduler. The scheduler assigns a communication resource to the terminal 20 with an identification number "0123".

According to the second example of the fifth embodiment, a delay reduction process is performed.

FIG. 22 shows a third example of the message processor 130 according to the fifth embodiment. The third example is different from the first example in that the message processor 130 of the third example does not include the message reception unit 132 and the message transmission unit 134. The message reception unit 132 is connected to an uplink between the RU 106 and the Low MAC layer 122. The message transmission unit 134 is connected to an uplink between the Low MAC layer 122 and the High MAC layer 120. The message reception unit 132 is connected to an uplink between the RU 106 and the Low MAC layer 122. A message reception unit 162 is connected to a downlink between the High MAC layer 120 and the Low MAC layer 122. A message transmission unit 164 is connected to a downlink between the Low MAC layer 122 and the RU 106. The High MAC layer 120 transmits user data to the Low MAC layer 122 through the message reception unit 162. The Low MAC layer 122 may include the message transmission unit 134, the message reception unit 132, the message reception unit 162, and the message transmission unit 164.

The Low MAC layer 122 interprets the Low MAC message from the message reception unit 132 and transmits an interpretation result 122*a* to the message processor 130. An example of the interpretation result 122*a* is {RNTI: "0123", FRAME:X, SLOT:Y, DATA_TYPE:UP, DATA_SIZE:300} which is the same as the interpretation result 122*a* of FIG. 20. The message processor 130 transmits the interpretation result 122*a* to the agent 136.

The agent 136 generates a new message 136 *a* based on the interpretation result 122*a* and transmits the message 136 *a* to a scheduler 170. An example of the message 136 *a* is {RNTI:"0123", STATUS:"start"} which is the same as message 136 *a* of FIG. 20.

When the scheduler 170 receives the message 136 *a*, the scheduler 170 assigns a communication resource to the terminal 20 with an identification number "0123".

According to the third example of the fifth embodiment, a delay reduction process is performed.

According to the fifth embodiment, the DU 104 includes the message processor 130. The scheduler assigns a communication resource to the terminal 20 before the terminal 20 transmits uplink data, thereby reducing a communication delay.

The message processor 130 can inject a message into a downlink. As described in the first embodiment, an example of downlink message is a message indicating that the terminal 20 can transmit the scheduling request. Therefore, the terminal 20 frequently transmits the scheduling request and a communication delay time is reduced.

The message processor 130 of the fifth embodiment can incorporate a control priority of the delay reduction process of a terminal as described in the fourth embodiment. In a manner similar to FIG. 16, the application server 10 determines a first terminal or terminals 20 with a high priority and a second terminal or terminals 20 with a low priority. The application server 10 transmits identification information of the first terminal or terminals and timing information indicating a start timing of the delay reduction process of the first terminal or terminals to the message processor 130. The agent 136 includes a function of the filter unit 46 of FIG. 17. The message processor 130 prioritizes the delay reduction process of the first terminal or terminals over the delay reduction process of the second terminal or terminals.

Sixth Embodiment

Figure 23:
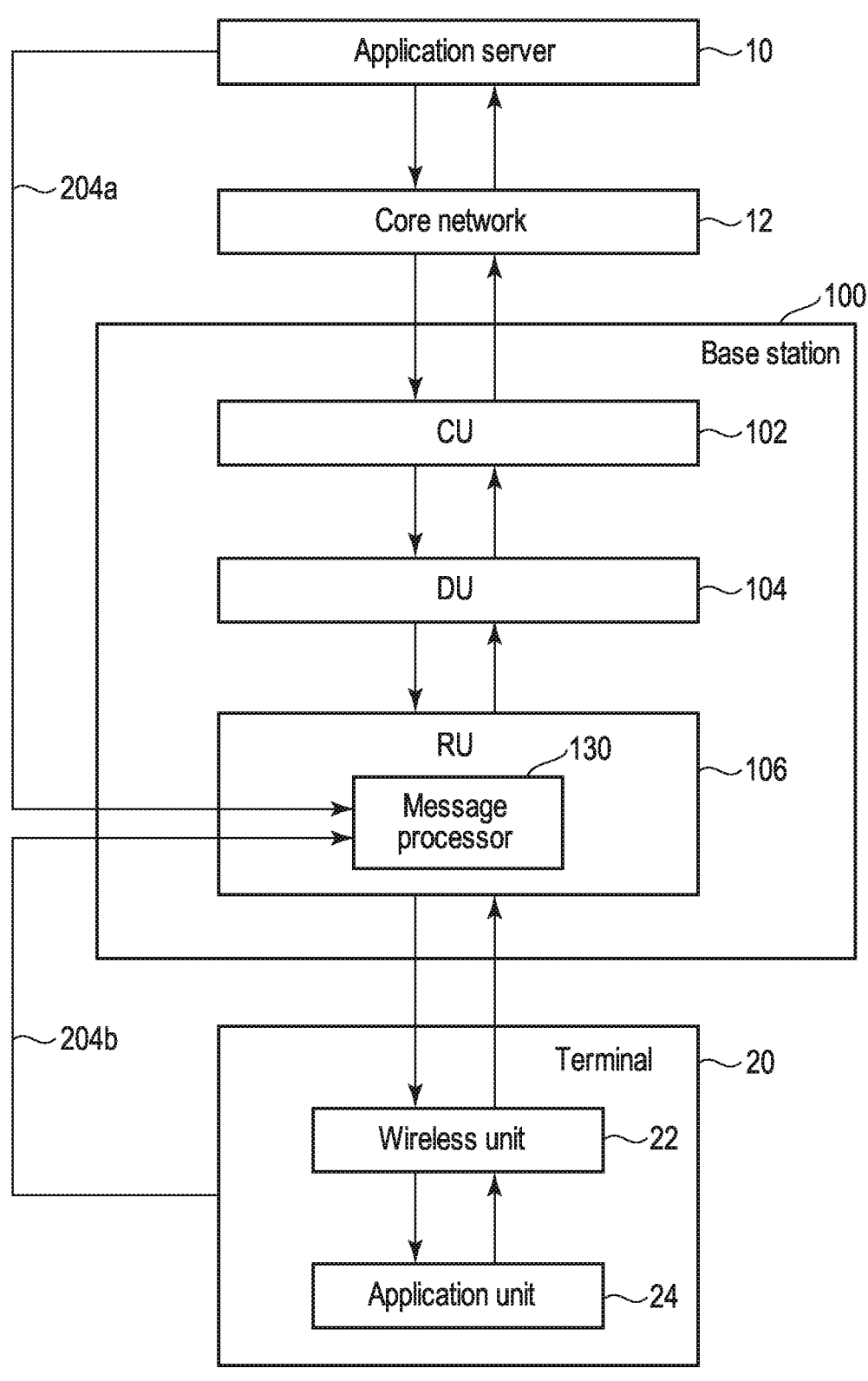
FIG. 23 shows an example of the base station according to a sixth embodiment.

FIG. 23 shows an example of the base station 100 according to a sixth embodiment. The RU 106 comprises the message processor 130.

FIG. 24 shows a first example of the message processor 130 according to the sixth embodiment. The message processor 130 is connected to the High PHY layer 124 or the Low PHY layer 126. FIG. 24 shows an example wherein the message processor 130 is connected to the High PHY layer 124. The High PHY layer 124 transmits an uplink High PHY message transmitted from the Low PHY layer 126 to the EU 104 and the message processor 130. The High PHY layer 124 transmits a downlink High PHY message transmitted from the DU 104 to the Low PHY layer 126 and the message processor 130.

The message processor 130 includes a message reception unit 176 for receiving a High PHY message from the High PHY layer 124, a message interpretation unit 180 for interpreting the received message as MAC message, the agent 136 for generating a High PHY message, a message transmission unit 178 for transmitting the generated message to the High PHY layer 124, and the linkage unit 142.

The agent 136 implements a function like the agent 50 shown in the FIG. 7, and includes the message injection unit 152, the message generation unit 154, the parameter storage unit 156, and the communication detection unit 158.

The linkage unit 142 implements a function like the linkage unit 64 (FIG. 11) of the third embodiment, and includes the acquisition unit 144 and the RNTI-IP association unit 146. The RU 106 includes a port 172 for connecting the linkage unit 142 to the application server 10 and the terminal 20.

The message reception unit 176 receives a High PHY message 124 *a* from the High PHY layer 124. An example of the message 124 *a* is {RNTI:"0123", FRAME:X, SLOT:Y, MAC_PAYLOAD="01230123 . . . "}.

The message interpretation unit 180 interprets the message {RNTI:"0123", FRAME:X, SLOT:Y, MAC_PAYLOD="01230123 . . . "} from the message reception unit 176 as a MAC message and transmits an interpretation result 180*a* to the agent 136. An example of the interpretation result 180*a* is {RNTI:"0123", FRAME:X, SST:Y, DATA_TYPE: UP, DATA_SIZE:300} which is the same as the interpretation result 122*a* of FIG. 20.

The agent 136 generates a new message 136 *a* based on the interpretation result 180*a* and transmits the message 136 *a* to the High PHY layer 124. An example of the message 136*a* is {RNTI:"0123", STATUS: "start"} which is the same as the message of FIG. 20.

When the High PIS layer 124 receives the message 136 *a*, the High PHY layer 124 generates a High PHY message 124*b* and transmits the message 124*b* to the DU 104. An example of the message 124*b* is {RNTI:"0123", SR:true, FRAMEX, SLOT:Y}.

When the Low MAC layer 122 in the DU 104 receives the message 124*b*, the Low MAC layer 122 activates a scheduler. The scheduler assigns a communication resource to the terminal 20 with an identification number "0123". Thus, the scheduler assigns a communication resource to the terminal 20 before the terminal 20 transmits data, thereby reducing the delay time. The message 124*b* is equivalent to the scheduling request transmitted by the terminal 20.

According to the first example of the sixth embodiment, the message processor 130 injects a message equivalent to the scheduling request transmitted by the terminal 20 into the High PHY layer 124 or the Low PHY layer 126 in the RU 106. The scheduler assigns a communication resource to the terminal 20 before the terminal 20 transmits data. Therefore, the delay time between a data generation timing of the terminal 20 and a data transmission timing of the terminal 20 is reduced and a delay reduction process is performed.

FIG. 25 shows a second example of the message processor 130 according to the sixth embodiment. The message processor 130 of the second example is the same as the message processor 130 of the first example. The RU 106 of the second example is different from the RU 106 of the first example in that the UR 106 further include a message transmission unit 177 and a message reception unit 179. The message transmission unit 177 is connected to an uplink between the High PHY layer 124 and the DU 104. The message reception unit 179 is connected to a downlink between the DU 104 and the High PHY layer 124. The message transmission unit 177 transmits a message transmitted from the High PHY layer 124 to the DU 104 and the message processor 130.

An example of a message 177*a* transmitted from the message transmission unit 177 to the message processor 130 is {PNTI:"0123", FRAME:X, SLOT:Y, MAC_PAY-LOAD="01230123 . . . "} which is the same as the message of the first example. Therefore, the message processor 130 transmits the message 136 *a* ({RNTI:"0123", STATUS: "start"}) to the High PHY layer 124.

According to the second example of the sixth embodiment, a delay reduction process is performed.

FIG. 26 shows a third example of the message processor 130 according to the sixth embodiment. The High PHY layer 124 includes the message processor 130. The message processor 130 of the third example is different from the message processor 130 of the first example in that the message processor 130 of the third example does not include the message reception unit 176 and the message transmission unit 178.

The High PHY layer 124 interprets the High PHY message transmitted from the Low PHY layer 126 and transmits an interpretation result 124 *a* to the message processor 130. An example of the interpretation result 124 *a* is {RNTI: "0123", FRAME:X, SLOT:Y, DATA_TYPE:UP, DATA_SIZE:300} which is the same as the interpretation result 180*a* of FIG. 24. The message processor 130 transmits the interpretation result 124 *a* to the agent 136.

The agent 136 generates a new message 136 *a* based on the interpretation result 124 *a* and transmits the message 136 *a* to the DU 104 through the message transmission unit 177. An example of the message 136 *a* is {RNTI:"0123", SR:true, STATUS:"start"} which is the same as the interpretation result of FIG. 24.

According to the third example of the sixth embodiment, a delay reduction process is performed.

According to the sixth embodiment, the RU 106 includes the message processor 130. The scheduler assigns a communication resource to the terminal 20 before the terminal 20 transmits uplink data, thereby reducing a communication delay.

The message processor 130 can inject a message into a downlink. As described in the first embodiment, an example of downlink message is a message indicating that the terminal 20 can transmit the scheduling request. Therefore, the terminal 20 frequently transmits the scheduling request and a communication delay time is reduced.

Seventh Embodiment

FIG. 27 shows an example of the base station 100 according to a seventh embodiment. The base station 100 includes the message processor 130 connected to the Low MAC layer 122 of the DU 104.

FIG. 28 shows a first example of the message processor 130 according to the seventh embodiment. The message processor 130 includes a message reception unit 184 for receiving a message from the DU 104, a message transmission unit 186 for transmitting a message to the DU 104, the agent 136, and the linkage unit 142. The message processor 130 includes a port 182 for connecting the linkage unit 142 to the application server 10 end the terminal 20.

The Low MAC layer 122 in the DU 104 interprets a Low MAC message and transmits an interpretation result 104 *a* to the message processor 130. An example of the interpretation result 104 *a* is {RNTI:"0123", FRAME:X, SLOT:Y, DATA_TYPE:UP, DATA_SIZE:300} which is the same as the interpretation result 122*a* of the first example of the fifth embodiment.

The message reception unit 184 transmits the interpretation result 104 *a* to the agent 136. The agent 136 generates a new message 136 *a* based on the interpretation result 104 *a* and transmits the message 136 *a* to the Low MAC layer 122 in the DU 104 by using the message transmission unit 186. An example of the message 136 *a* is {RNTI:"0123", STATUS:"start"} which is the same as the message of the first example of the fifth embodiment.

When the Low MAC layer 122 receives the message 136 *a*, the Low MAC layer 122 activates a scheduler. The scheduler assigns a communication resource to the terminal 20 with an identification number "0123". Thus, the scheduler assigns a communication resource to the terminal 20 before the terminal 20 transmits data, thereby reducing the delay time.

According to the first example of the seventh embodiment, a delay reduction process is performed.

FIG. 29 shows a second example of the message processor 130 according to the seventh embodiment. The message processor 130 of the second example is different from the message processor 130 of the first example in that the message processor 130 of the second example further includes the message is unit 180 and receives a message transmitted from the RU 106 not an interpretation result of the DU 104.

The RU 106 transmits a message 106 *a* to the message processor 130. An example of the message 106 *a* is {RNTI: "0123", FRAME:X, SLOT:Y, MAC_PAY-LOAD="01230123 . . . "}.

The message reception unit 184 transmits the message 106 *a* to the message interpretation unit 180. The message interpretation unit 180 interprets the message 106 *a* and transmits an interpretation result 180*a* to the agent 136. An example of the interpretation result 180*a* is {RNTI:"0123", FRAME:X, SLOT:Y, DATA_TYPE:UP, DATA_SIZE:300} which is the same as the interpretation result 104*a* of the first example of the seventh embodiment.

The agent 136 generates a new message 136 *a* based on the interpretation result 180*a* and transmits the message 136 *a* to the Low MAC layer 122 in the DU 104 by using the message transmission unit 186. An example of the message 136 *a* is {RNTI:"0123", STATUS:"start"} which is the same as the message of the first example of the seventh embodiment.

According to the second example of the seventh embodiment, a delay reduction process is performed.

According to the seventh embodiment, the message processor 130 is connected to the DU 104. The scheduler assigns a communication resource to the terminal 20 before the terminal 20 transmits uplink data, thereby reducing a communication delay.

The message processor 130 can inject a message into a downlink. As described in the first embodiment, an example of downlink message is a message indicating that the terminal 20 can transmit the scheduling request. Therefore, the terminal 20 frequently transmits the scheduling request and a communication delay time is reduced.

The seventh embodiment can be modified by connecting the message processor 130 to the RU 102 not to the DU 106. In the modification, the message processor 130 is connected to the Low PHY layer 126 or the High PHY layer 128. In to the RU 102 not to the DU 106.

The message processor 130 of the fifth embodiment can incorporate a control priority of the delay reduction process of a terminal as described in the fourth embodiment. In a manner similar to FIG. 28, the message processor 130 may receive an interpretation result of a PHY message from RU 106, generate a new PHY message based on the interpretation result, and transmit the new PHY message to the RU 106. In a manner similar to FIG. 29, the message processor 130 may receive a PHY message from the RU 106, interpret the PHY message, generate a new PHY message based on the interpretation result, and transmit the new PHY message to the RU 106.

The message processor 130 of the sixth and the seventh embodiments can incorporate a control priority of the delay reduction process of a terminal as described in the fifth embodiment.

According to the embodiments, following electronic apparatus, base station, communication system, method, and storage medium are provided.

(1) An electronic apparatus comprising a processor located in an interface which divides layers of a base station into two or more functional units, wherein
the processor is configured to:
  receive a first message transmitted from a first layer which is one of a next lower layer and a next upper layer;
  interpret the first message and transmit an interpreted first message to a second layer which is the other of the next lower layer and the next upper layer;
  generate a second message based on the interpreted first message;
  transmit the second message to the second layer; and
  control timing of transmitting the second message to the second layer.

(2) The electronic apparatus of (1), wherein
the processor is configured to:
  extract a parameter from the first message based on the interpreted first message; and
  generate the second message based on the parameter.

(3) The electronic apparatus of (1) or (2), wherein
the processor is configured to generate a message related to schedule information of a protocol used in the interface as the second message.

(4) The electronic apparatus of (1) or (2), wherein
the processor generates a message related to a scheduling request of a communication protocol used in the interface and defined by a mobile communication system as the second message.

(5) The electronic apparatus of (4), wherein
the processor is configured to periodically transmit a message related to the scheduling request as the second message.

(6) The electronic apparatus of (4) or (5), wherein
the processor is configured to:
  detect data transmission of a terminal connected to the base station; and
  periodically transmit a message related to the scheduling request as the second message based on the data transmission for a predetermined period.

(7) The electronic apparatus of (4) or (5), wherein
the processor is configured to:
  obtain timing information indicating a time at which a terminal connected to the base station transmits data, and
  transmit a message related to the scheduling request as the second message at a time based on the timing information.

(8) The electronic apparatus of (7), wherein
the processor is configured to transmit the message related to the scheduling request as the second message before a time at which the terminal transmits data.

(9) The electronic apparatus of (7) or (8), wherein
the processor is configured to receive the timing information from the base station or a server connected to the base station.

(10) The electronic apparatus of (4) or (5), wherein
the processor is configured to:
  obtain filter information indicating a terminal connected to the base station and execution timing of reduction in a delay of data communication, and
  transmit a message related to the scheduling request as the second message based on the filter information.

(11) The electronic apparatus of (10), wherein
the filter information is further configured to indicate a priority related to execution of the reduction in the delay of the data communication of the terminal, and
the processor is configured to transmit, to the second layer, as the second message, a message related to the scheduling request related to a terminal having a high priority at a time earlier than a message related to the scheduling request related to a terminal having a low priority.

(12) A base station comprising:
an electronic apparatus or one of (1) to (11);
a wireless device configured to communicate with a terminal; and
a communication device configured to communicate with a net.

(13) A communication system comprises:
an electronic apparatus of one of (1) to (11);
a wireless device configured to communicate with a terminal;
a communication device configured to communicate with a network; and
a server connected to the network.

(14) A method of an electronic apparatus located in an interface which divides layers of a base station into two or more functional units, the method comprising:
  receiving, bi the electronic apparatus, a first message transmitted from a first layer which is one of a next lower layer and a next upper layer;
  analyzing, by the electronic apparatus, the first message and transmit an interpreted first message to a second layer which is the other of the next lower layer and the next upper layer;
  generating, by the electronic apparatus, a second message based on the interpreted first message,
  transmitting, by the electronic apparatus, the second message to the second layer; and
  controlling, by the electronic apparatus, timing of transmitting the second message to the second layer.

(15) A non-transitory computer-readable storage medium storing computer-executable instructions that, when executed, cause a computer located in an interface which divides layers of a base station into two or more functional units to:

receive a first message transmitted from a first layer which is one of a next lower layer and a next upper layer;

interpret the first message and transmit an interpreted first message to a second layer which is the other of the next lower layer and the next upper layer;

generate a second message based on the interpreted first message;

transmit the second message to the second layer and control timing of transmitting the second message to the second layer.

(16) A base station comprising:

a first unit connected to a network;

a second unit connected to the first unit and configured to communicate with a wireless communication terminal; and a message processor, wherein the message processor is configured to generate a second message based on an interpretation result of a first message processed by the base station and transmit the second message to the first unit or the second unit;

the message processor is configured to control a transmission timing of the second message to the first unit or the second unit;

the message processor is included in the first unit or the second unit or the message processor is connected to the first unit and the second unit; and the first unit comprises a first processor configured to assign a communication resource based on the second message.

(17) The base station of (16), wherein the message processor is included in the first unit;

the second unit comprises a second processor;

the second processor is configured to interpret the first message and transmit an interpretation result of the first message to the message processor; and the message processor is configured to generate the second message based on the interpretation result of the first message and transmit the second message to the first processor.

(18) The base station of (16), wherein the message processor is included in the first unit; and the message processor is configured to receive the first message received by the first unit, interpret the first message, generate the second message based on an interpretation result of the first message, and transmit the second message to the first processor.

(19) The base station of (16), wherein the message processor is included in the first processor; and the message processor is configured to generate the second message based on an interpretation result of the first message by the first processor.

(20) The base station of (16), wherein the message processor is included in the second unit;

the second unit comprises a second processor;

the message processor is configured to receive the first message processed by the second processor, interpret the first message, generate the second message based on an interpretation result of the first message, and transmit the second message to the second processor; and the second processor is configured to transmit the second message to the first processor.

(21) The base station of (16), wherein the message processor is included in the second unit;

the second unit comprises a second processor;

the message processor is configured to receive the first message from the second processor, interpret the first message, generate the second message based on an interpretation result of the first message, and transmit the second message to the second processor; and the second processor is configured to transmit the second message to the first processor.

(22) The base station of (16), wherein the message processor is included in the second unit;

the second unit comprises a second processor configured to interpret the first message; and the message processor is configured to generate the second message based on an interpretation result of the first message and transmit the second message to the first processor.

(23) The base station of (16), wherein the message processor is connected to the first processor;

the first processor is configured to interpret the first message and transmit an interpretation result of the first message to the message processor; and the message processor is configured to generate the second message based on the interpretation result of the first message and transmit the second message to the first processor.

(24) The base station of (16), wherein the message processor is connected to the first processor; and the message processor is configured to receive the first message received by the first processor, interpret the first message, generate the second message based on an interpretation result of the first message, and transmit the second message to the first processor.

(25) The base station of one of (16) to (24), wherein the message processor is configured to:

extract a parameter from the first message; and generate the second message based on the parameter.

(26) The base station of one of (16) to (24), wherein the message processor is configured to generate a message related to schedule information of a protocol used in an interface between the first unit and the second unit as the second message.

(27) The base station of one of (16) to (24), wherein the message processor generates a message related to scheduling request of a communication protocol used in an interface between the first unit and the second unit and defined by a mobile communication system as the second message.

(28) The base station of (27), wherein the message processor is configured to periodically transmit a message related to the scheduling request as the second message.

(29) The base station of (27), where in the message processor is configured to:

detect data transmission of the terminal; and periodically transmit a message related to the scheduling request as the second message based on the data transmission for a predetermined period.

(30) The base station of (27), wherein the message processor is configured to:

obtain timing information indicating a time at which the terminal transmits data, and transmit a message related to the scheduling request as the second message at a time based on the timing information.

(31) The base station of (27), wherein the message processor is configured to:

obtain filter information indicating the terminal and execution timing of reduction in a delay of data communication, and transmit a message related to the scheduling request as the second message based on the filter information.

(32) The base station of (31), wherein the filter information further configured to indicate a priority related to execution of the reduction in the delay of the data communication of the terminal, and the message processor is configured to transmit, to the first processor, as the second message, a message related to the scheduling request related to a terminal having a high priority at a time earlier than a message related to the scheduling request related to a terminal having a low priority.

(33) The base station of (30), wherein the message processor is configured to transmit the message related to the scheduling request as the second message before a time at which the terminal transmits data.

(34) The base station of (30), wherein the message processor is configured to receive the timing information from the terminal or a server connected to the base station.

(35) A method of an electronic apparatus comprising a first unit connected to a network; a second unit connected to the first unit and configured to communicate with a wireless communication terminal; and a message processor included in the first unit or the second unit or connected to the first unit; and the method comprising:

generating, by the message processor, a second message based on an interpretation result of a first message processed by the base station;

transmitting, by the message processor, the second message to the first unit or the second unit;

controlling, by the message processor, a transmission timing of the second message to the first unit or the second unit; and assigning, by the first unit, a communication resource based on the second message.

(36) A non-transitory computer-readable storage medium storing computer-executable instructions that, when executed, cause a computer of a base station comprising a first unit connected to a network and a second unit connected to the first unit and configured to communicate with a wireless communication terminal, to:

generate a second message based on an interpretation result of a first message processed by the base station;

transmit the second message to the first unit or the second unit;

control a transmission timing of the second message to the first unit or the second unit; and assign a communication resource based on the second message.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fail within the scope and spirit of the inventions.

What is claimed is:

1. An electronic apparatus comprising a processor, the processor being connected to an interface between a first layer and a second layer, the first layer and the second layer being layers in a protocol stack of a base station defined by a communication standard, and the processor being configured to:

receive a first message transmitted from the first layer;

interpret the first message and transmit an interpreted first message to the second layer;

generate a second message based on the interpreted first message, the second message being different from the interpreted first message;

control to set a timing at which the second message is to be transmitted to the second layer; and transmit the second message to the second layer based on the timing having been set, wherein:

the processor is configured to extract a parameter from the first message based on the interpreted first message, and to generate the second message based on the parameter, or the processor is configured to generate a message related to schedule information of a protocol used in the interface as the second message, or the processor is configured to generate a message related to a scheduling request of a communication protocol used in the interface and defined by a mobile communication system as the second message.

2. The electronic apparatus of claim 1, wherein the processor is configured to periodically transmit a message related to the scheduling request as the second message.

3. The electronic apparatus of claim 1, wherein the processor is configured to:

detect data transmission of a terminal connected to the base station; and periodically transmit a message related to the scheduling request as the second message based on the data transmission for a predetermined period.

4. The electronic apparatus of claim 1, wherein the processor is configured to:

obtain timing information indicating a time at which a terminal connected to the base station transmits data, and transmit a message related to the scheduling request as the second message at a time based on the timing information.

5. The electronic apparatus of claim 4, wherein the processor is configured to transmit the message related to the scheduling request before a time at which the terminal transmits data.

6. The electronic apparatus of claim 4, wherein the processor is configured to receive the timing information from the base station or a server connected to the base station.

7. The electronic apparatus of claim 1, wherein the processor is configured to:

obtain filter information indicating a terminal connected to the base station and an execution timing of a reduction in a delay of data communication, and transmit a message related to the scheduling request as the second message based on the filter information.

8. The electronic apparatus of claim 7, wherein:

the filter information further indicates a priority related to execution of the reduction in the delay of the data communication of the terminal, and the processor is configured to transmit, to the second layer, as the second message, a message related to the scheduling request related to a terminal having a higher priority at a time earlier than a message related to the scheduling request related to a terminal having a lower priority.

9. A base station comprising:

the electronic apparatus of claim 1;

a wireless device configured to communicate with a terminal; and a communication device configured to communicate with a network.

10. A communication system comprising:

the electronic apparatus of claim 1;

a wireless device configured to communicate with a terminal;

a communication device configured to communicate with a network; and a server connected to the network.

11. The electronic device of claim 1, wherein:

the first layer is connected to a wireless terminal, and the second layer is connected to a network.

12. The electronic apparatus of claim 1, wherein:

the first layer is connected to a wireless terminal, and the second layer is configured to, in response to receiving the second message, assign a communication resource for the wireless terminal.

13. The electronic apparatus of claim 1, wherein:

the first layer is one of a Radio Resource Control layer, a Packet Data Convergence Protocol layer, a Radio Link Control layer, a Media Access Control layer, and a Physical layer, and the second layer is another one of the Radio Resource Control layer, the Packet Data Convergence Protocol layer, the Radio Link Control layer, the Media Access Control layer, and the Physical layer.

14. The electronic apparatus of claim 1, wherein the parameter comprises a Radio Network Temporary Identifier identifying a terminal connected to the base station, and a frame number and a slot number of a message transmitted by the terminal.

15. The electronic apparatus of claim 14, wherein the second message comprises a scheduling request equivalent to the first message transmitted from the first layer.

16. The electronic apparatus of claim 1, wherein the first layer is a lower layer than the second layer.

17. The electronic apparatus of claim 1, wherein the second message comprises a message indicating that the scheduling request can be transmitted.

18. A method of an electronic apparatus connected to an interface between a first layer and a second layer, the first layer and the second layer being layers in a protocol stack of a base station defined by a communication standard, and the method comprising:

receiving, by the electronic apparatus, a first message transmitted from the first layer;

analyzing, by the electronic apparatus, the first message and transmitting an interpreted first message to the second layer;

generating, by the electronic apparatus, a second message based on the interpreted first message, the second message being different from the interpreted first message;

controlling, by the electronic apparatus, to set a timing at which the second message is to be transmitted to the second layer; and transmitting, by the electronic apparatus, the second message to the second layer based on the timing having been set, wherein the generating the second message comprises:

extracting a parameter from the first message based on the interpreted first message, and generating the second message based on the parameter, or generating a message related to schedule information of a protocol used in the interface as the second message, or generating a message related to a scheduling request of a communication protocol used in the interface and defined by a mobile communication system as the second message.

19. The method of claim 18, wherein:

the first layer is one of a Radio Resource Control layer, a Packet Data Convergence Protocol layer, a Radio Link Control layer, a Media Access Control layer, and a Physical layer, and the second layer is another one of the Radio Resource Control layer, the Packet Data Convergence Protocol layer, the Radio Link Control layer, the Media Access Control layer, and the Physical layer.

20. A non-transitory computer-readable storage medium storing computer-executable instructions for a computer connected to an interface between a first layer and a second layer, the first layer and the second layer being layers in a protocol stack of a base station defined by a communication standard, and the instructions being executed by the computer to control the computer to:

receive a first message transmitted from the first layer;

interpret the first message and transmit an interpreted first message to the second layer;

perform generation of a second message based on the interpreted first message, the second message being different from the interpreted first message;

control to set a timing at which the second message is to be transmitted to the second layer; and transmit the second message to the second layer based on the timing having been set, wherein the generation of the second message comprises:

extracting a parameter from the first message based on the interpreted first message, and generating the second message based on the parameter, or generating a message related to schedule information of a protocol used in the interface as the second message, or generating a message related to a scheduling request of a communication protocol used in the interface and defined by a mobile communication system as the second message.

21. The non-transitory computer-readable storage medium of claim 20, wherein:

the first layer is one of a Radio Resource Control layer, a Packet Data Convergence Protocol layer, a Radio Link Control layer, a Media Access Control layer, and a Physical layer, and the second layer is another one of the Radio Resource Control layer, the Packet Data Convergence Protocol layer, the Radio Link Control layer, the Media Access Control layer, and the Physical layer.

* * * * *